(12) United States Patent
Lima et al.

(10) Patent No.: US 10,995,195 B2
(45) Date of Patent: May 4, 2021

(54) COMPOSITE NANOFIBER SHEET

(71) Applicant: Lintec of America, Inc., Richardson, TX (US)

(72) Inventors: Marcio D. Lima, Richardson, TX (US);
Julia Bykova, Richardson, TX (US);
Takahiro Ueda, Richardson, TX (US)

(73) Assignee: LINTEC OF AMERICA, INC., Richardson, TX (US)

( * ) Notice: Subject to any disclaimer, the term of this patent is extended or adjusted under 35 U.S.C. 154(b) by 19 days.

(21) Appl. No.: 15/916,802

(22) Filed: Mar. 9, 2018

(65) Prior Publication Data
US 2018/0194102 A1 Jul. 12, 2018

Related U.S. Application Data

(63) Continuation of application No. PCT/US2016/051672, filed on Sep. 14, 2016.
(Continued)

(30) Foreign Application Priority Data

Sep. 14, 2015 (JP) .............................. JP2015-180950

(51) Int. Cl.
*C09J 7/38* (2018.01)
*C08K 3/04* (2006.01)
(Continued)

(52) U.S. Cl.
CPC ................ *C08K 3/041* (2017.05); *B32B 5/02* (2013.01); *B32B 5/12* (2013.01); *B32B 7/06* (2013.01);
(Continued)

(58) Field of Classification Search
CPC ....... C08K 3/041; C09J 7/38; C09J 2301/314; B32B 5/02; B32B 7/12; B32B 9/007;
(Continued)

(56) References Cited

U.S. PATENT DOCUMENTS 4,258,100 A 3/1981 Fujitani et al.
4,301,040 A 11/1981 Berbeco
(Continued)

FOREIGN PATENT DOCUMENTS

CN 102026066 4/2011
CN 104125925 10/2014
(Continued)

OTHER PUBLICATIONS

Extended European Search Report for EP Application No. 16847234.8, dated Jun. 4, 2019. 8 pages.
(Continued)

*Primary Examiner* — Joanna Pleszczynska
(74) *Attorney, Agent, or Firm* — Greenblum & Bernstein, P.L.C.

(57) ABSTRACT

Examples described include composite nanofibers sheets that have been "infiltrated" with a polymer (i.e., the polymer has flowed past a surface of the nanofiber sheet and into at least some of spaces within the sheet defined by the nanofibers). An adhesive nanofiber tape is formed when the infiltrating polymer is an adhesive and the adhesive infiltrates the nanofiber sheet from a one major surface of the nanofiber sheet. In other described examples, some portions of nanofibers in the sheet have been conformally coated with at least one metal layer.

16 Claims, 10 Drawing Sheets

Related U.S. Application Data

(60) Provisional application No. 62/383,017, filed on Sep. 2, 2016.

(51) Int. Cl.

| | | |
|---|---|---|
| *B32B 3/28* | (2006.01) | |
| *B32B 5/02* | (2006.01) | |
| *B32B 5/12* | (2006.01) | |
| *B32B 7/12* | (2006.01) | |
| *B32B 9/00* | (2006.01) | |
| *B32B 15/14* | (2006.01) | |
| *C09J 9/02* | (2006.01) | |
| *C09J 7/22* | (2018.01) | |
| *C08J 5/18* | (2006.01) | |
| *C08J 7/04* | (2020.01) | |
| *C08J 7/043* | (2020.01) | |
| *C08J 7/044* | (2020.01) | |
| *B32B 7/06* | (2019.01) | |
| *C09J 201/02* | (2006.01) | |
| *B32B 17/10* | (2006.01) | |
| *B32B 27/30* | (2006.01) | |
| *C08J 5/04* | (2006.01) | |
| *C08L 23/08* | (2006.01) | |
| *C08L 29/14* | (2006.01) | |
| *C08K 3/08* | (2006.01) | |
| *C08K 7/06* | (2006.01) | |
| *B82Y 40/00* | (2011.01) | |
| *B32B 9/04* | (2006.01) | |

(52) U.S. Cl.
CPC ............... *B32B 7/12* (2013.01); *B32B 9/007* (2013.01); *B32B 15/14* (2013.01); *B32B 17/10889* (2013.01); *B32B 27/30* (2013.01); *C08J 5/042* (2013.01); *C08J 5/18* (2013.01); *C08J 7/043* (2020.01); *C08J 7/044* (2020.01); *C08J 7/0427* (2020.01); *C08K 3/08* (2013.01); *C08L 23/0853* (2013.01); *C08L 29/14* (2013.01); *C09J 7/22* (2018.01); *C09J 7/38* (2018.01); *C09J 9/02* (2013.01); *C09J 201/02* (2013.01); *B32B 9/043* (2013.01); *B32B 17/10788* (2013.01); *B32B 2260/021* (2013.01); *B32B 2260/046* (2013.01); *B32B 2307/202* (2013.01); *B32B 2307/732* (2013.01); *B32B 2307/748* (2013.01); *B32B 2311/18* (2013.01); *B82Y 40/00* (2013.01); *C08J 2383/04* (2013.01); *C08J 2483/04* (2013.01); *C08K 3/04* (2013.01); *C08K 3/042* (2017.05); *C08K 3/045* (2017.05); *C08K 7/06* (2013.01); *C08K 2003/0831* (2013.01); *C08K 2003/0881* (2013.01); *C08K 2201/011* (2013.01); *C09J 2301/16* (2020.08); *C09J 2301/302* (2020.08); *C09J 2301/314* (2020.08); *C09J 2301/40* (2020.08); *C09J 2301/408* (2020.08)

(58) Field of Classification Search
CPC ..... B32B 15/14; B32B 3/28; B32B 2307/732; B32B 5/12
See application file for complete search history.

(56) References Cited

U.S. PATENT DOCUMENTS

| | | | |
|---|---|---|---|
| 4,874,549 A | 10/1989 | Michalchik | |
| 4,943,978 A | 7/1990 | Rice | |
| 5,925,275 A | 7/1999 | Lawson et al. | |
| 7,067,328 B2 | 6/2006 | Dubrow et al. | |
| 7,462,498 B2 | 12/2008 | Mao et al. | |
| 7,622,314 B2 | 11/2009 | Liang | |
| 7,641,885 B2 | 1/2010 | Liu et al. | |
| 7,648,406 B2 | 1/2010 | Tai et al. | |
| 7,662,467 B2 | 2/2010 | Li et al. | |
| 7,811,149 B2 | 10/2010 | Liu et al. | |
| 7,854,992 B2 | 12/2010 | Fu et al. | |
| 7,947,145 B2 | 5/2011 | Wang et al. | |
| 8,007,617 B2 | 8/2011 | Min et al. | |
| 8,076,829 B2 | 12/2011 | Chen et al. | |
| 8,084,097 B2 | 12/2011 | Fisher et al. | |
| 8,318,033 B2 | 11/2012 | Fu et al. | |
| 8,351,220 B2 * | 1/2013 | Liang .................. H01B 1/04 361/816 |
| 8,974,960 B2 | 3/2015 | Manthiram et al. | |
| 9,067,791 B2 | 6/2015 | Kim et al. | |
| 9,095,639 B2 | 8/2015 | Ajayan et al. | |
| 2005/0062024 A1 | 3/2005 | Bessette et al. | |
| 2006/0057388 A1 | 3/2006 | Jin et al. | |
| 2007/0012900 A1 * | 1/2007 | Callen .................. H01B 1/24 252/500 |
| 2008/0245548 A1 | 10/2008 | Fu et al. | |
| 2008/0292840 A1 | 11/2008 | Majumdar et al. | |
| 2009/0047513 A1 | 2/2009 | Lashmore | |
| 2009/0068387 A1 * | 3/2009 | Panzer .................... B32B 37/02 428/40.1 |
| 2009/0159198 A1 | 6/2009 | Wang et al. | |
| 2009/0264036 A1 | 10/2009 | Yano et al. | |
| 2010/0003877 A1 | 1/2010 | Fan et al. | |
| 2010/0009267 A1 | 1/2010 | Chase et al. | |
| 2010/0098931 A1 | 4/2010 | Daniel et al. | |
| 2010/0261058 A1 | 10/2010 | Lopatin et al. | |
| 2010/0296677 A1 | 11/2010 | Jiang et al. | |
| 2010/0311866 A1 | 12/2010 | Huang et al. | |
| 2011/0007477 A1 | 1/2011 | Xu et al. | |
| 2011/0069860 A1 | 3/2011 | Liu et al. | |
| 2011/0159269 A1 | 6/2011 | Qian et al. | |
| 2011/0160372 A1 | 6/2011 | Youm et al. | |
| 2011/0259518 A1 | 10/2011 | Tojo et al. | |
| 2013/0118682 A1 | 5/2013 | Zeininger | |
| 2013/0171406 A1 | 7/2013 | Suehiro et al. | |
| 2013/0341081 A1 | 12/2013 | Liang et al. | |
| 2014/0035708 A1 | 2/2014 | Athanasiou et al. | |
| 2014/0124495 A1 | 5/2014 | Feng et al. | |
| 2014/0151111 A1 | 6/2014 | Shah et al. | |
| 2014/0287641 A1 | 9/2014 | Steiner, III | |
| 2015/0014047 A1 | 1/2015 | Hutchison et al. | |
| 2015/0034859 A1 | 2/2015 | Compton et al. | |
| 2015/0044656 A1 | 2/2015 | Eichhorn et al. | |
| 2015/0118514 A1 | 4/2015 | Zhao et al. | |
| 2015/0140888 A1 | 5/2015 | Lee et al. | |
| 2015/0147573 A1 | 5/2015 | Zhang et al. | |
| 2015/0191636 A1 | 7/2015 | Otaka et al. | |
| 2018/0043665 A1 | 2/2018 | Ovalle | |
| 2018/0194101 A1 | 7/2018 | Lima et al. | |

FOREIGN PATENT DOCUMENTS

| | | |
|---|---|---|
| DE | 3146235 | 5/1983 |
| EP | 0342258 | 11/1989 |
| JP | 05013983 A | 1/1993 |
| JP | H09190921 A | 7/1997 |
| JP | 2000027072 A | 1/2000 |
| JP | 2003336166 A | 11/2003 |
| JP | 2004269878 A | 9/2004 |
| JP | 2005007861 A | 1/2005 |
| JP | 2005063994 A | 10/2005 |
| JP | 2008145208 A | 6/2008 |
| JP | 2008523254 A | 7/2008 |
| JP | 2009542860 A | 12/2009 |
| JP | 2010006663 A | 1/2010 |
| JP | 201535333 A | 11/2010 |
| JP | 2013514210 A | 4/2013 |
| JP | 2014508054 A | 4/2014 |
| JP | 2015528827 A | 10/2015 |
| JP | 2015-211180 A | 11/2015 |
| WO | 2005/070656 | 8/2005 |
| WO | 2005070656 A2 | 8/2005 |
| WO | 2007015710 A2 | 2/2007 |

(56) References Cited

FOREIGN PATENT DOCUMENTS

| WO | 2008005782 A2 | 1/2008 |
|---|---|---|
| WO | 2009106389 A2 | 2/2009 |
| WO | 2011075344 A1 | 6/2011 |
| WO | 2012094398 A1 | 7/2012 |
| WO | 2013/162649 | 10/2013 |
| WO | 2013183882 A1 | 12/2013 |
| WO | 2014-089081 | 6/2014 |
| WO | 2016126827 A1 | 8/2016 |
| WO | JP2016136686 A1 | 11/2017 |

OTHER PUBLICATIONS

Japanese Office Action for JP Application No. 2018-532545, dated Mar. 22, 2019. 4 pages.
Japanese Office Action for JP Application No. 2018-532541, dated Mar. 29, 2019. 4 pages.
Supplementary European Search Report for EP Application No. 168472704.1, dated Oct. 29, 2018, 6 pages.
Notice of Allowance for U.S. Appl. No. 15/915,608, dated Nov. 8, 2018, 26 pages.
English Translation of CN Office Action and Search Report for CN Application No. 201680053360.5 dated Jul. 30, 2019. 10 pages.
English Translation of CN Office Action and Search Report for CN Application No. 201680053441.5 dated Jul. 29, 2019. 3 pages.
English Translation of KR Office Action for KR Application No. 10-2018-7007498, dated Mar. 15, 2019. 2 pages.
European Communication pursuant to Article 94(3) EPC for EP Application No. 16847204.1, dated Mar. 8, 2019. 9 pages.
English Translation of KR Office Action for KR Application No. 10-2018-7007603, dated Mar. 18, 2019. 2 pages.
Extended European Search Report for EP Application No. 16847213.2, dated Aug. 8, 2018, 4 pages.
Partial Supplementary European Search Report for EP Application No. 168472704.1, dated Aug. 8, 2018, 12 pages.
Non-Final Rejection, in U.S. Appl. No. 15/915,608, dated Aug. 30, 2018, 19 pages.
Duncan et al., "Techniques for Characterising the Wetting, Coating and Spreading of Adhesives on Surfaces", National Physical Laboratory, Mar. 2005, NPL Report DEPC-MPR-020, Middlesex, UK, 48 pages.
International Search Report and Written Opinion for Patent Application No. PCT/US2016/051672, dated Dec. 20, 2016, 12 pages.
International Search Report and Written Opinion for Patent Application No. PCT/US2016/051686, dated Jan. 9, 2017, 14 pages.
International Search Report and Written Opinion for Patent Application No. PCT/US2016/051689, dated Jan. 30, 2017, 15 pages.
International Search Report and Written Opinion for Patent Application No. PCT/US2016/051742, dated Dec. 19, 2016, 12 pages.
Munir, et al., "Carbon Nanotube Reinforced Titanium Metal Matrix Composites Prepared by Powder Metallurgy—A Review", Critical Reviews in Solid State and Material Sciences, 0:1-18, Aug. 2014, 19 pages.
Zou, et al, "Carbide-Forming Groups IVB-VIB Metals: A New Territory in the Periodic Table for CVD Growth of Graphene", NANO Letters, American Chemical Society, ACS Publications, May 29, 2014, vol. 14, pp. 3832-3839.
Non-Final Office Action and Search Report for Taiwan Patent Application No. 105130024, dated Aug. 22, 2017, 11 pages.
Translation of JP Office Action for JP Application No. 2018-532538, dated May 15, 2020. 6 pages.
International Preliminary Report on Patentability for PCT/US2016/051686, dated Mar. 29, 2018. 7 pages.
International Preliminary Report on Patentability for PCT/US2016/051742, dated Mar. 29, 2018. 9 pages.
International Preliminary Report on Patentability for PCT/US2016/051689, dated Mar. 29, 2018. 8 pages.
International Preliminary Report on Patentability for PCT/US2016/051672, dated Mar. 29, 2018. 10 pages.

* cited by examiner

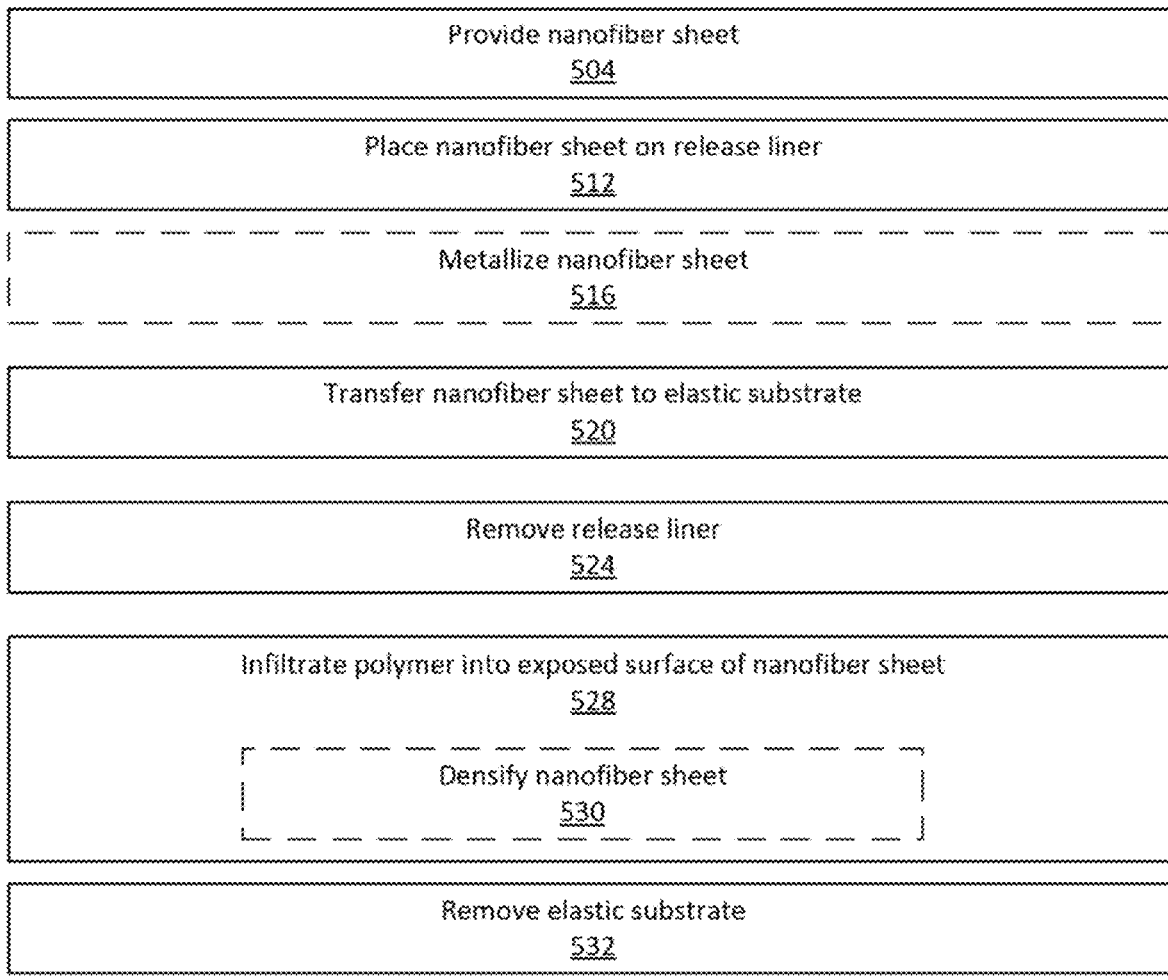
FIG. 5
500
Provide nanofiber sheet
504
Place nanofiber sheet on release liner
512
Metallize nanofiber sheet
516
Transfer nanofiber sheet to elastic substrate
520
Remove release liner
524
Infiltrate polymer into exposed surface of nanofiber sheet
528
Densify nanofiber sheet
530
Remove elastic substrate
532
FIG. 6A
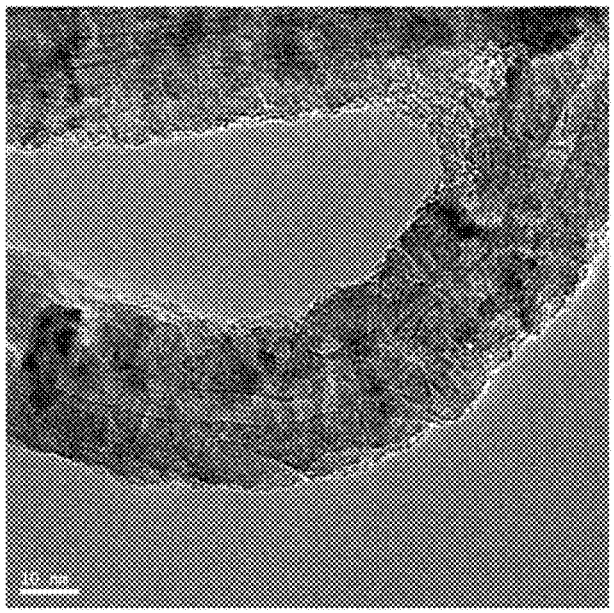
FIG. 6B
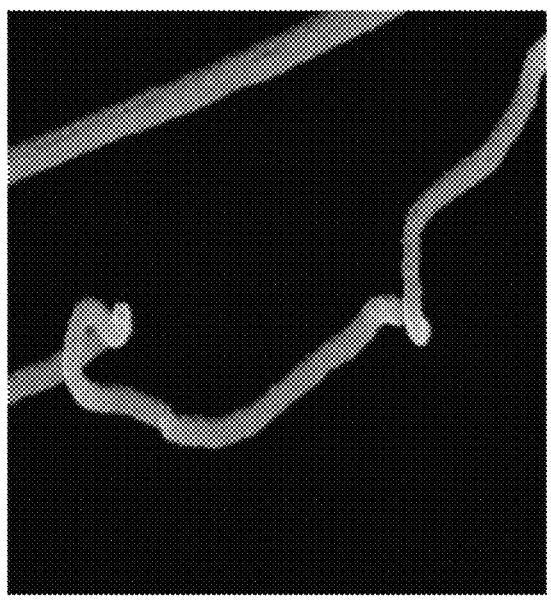

Longitudinal Axis of Buckles

Longitudinal Axis of Buckles ing features. The composite nanofiber sheet where the polymer layer is an adhesive layer. The composite nanofiber sheet where the adhesive layer is also disposed proximate to at least a portion of the first major surface of the nanofiber sheet, the composite nanofiber sheet thus forming a conductive double-sided pressure sensitive adhesive nanofiber tape. The composite nanofiber sheet further including an elastic substrate on which the nanofiber sheet, the first conformal metal layer, and the polymer layer are disposed. The composite nanofiber sheet where the elastic substrate, the nanofiber sheet, the first conformal metal layer, and the polymer layer collectively have a first length in a contracted state and a second length up to approximately seven times the first length in an extended state. The composite nanofiber sheet where a sheet resistance of the composite nanofiber sheet in the contracted state is approximately the same as a sheet resistance in the extended state. The composite nanofiber sheet where a thickness of the composite nanofiber sheet is less than 30 □m. The composite nanofiber sheet further including a solder contact connected to the first major surface via the first conformal metal layer. The composite nanofiber sheet further including an electrical conductor connected to the solder contact. The composite nanofiber sheet where the first conformal metal layer is a carbide-forming metal layer. The composite nanofiber sheet where the carbide-forming metal is titanium. The composite nanofiber sheet where the first conformal metal layer is less than 30 nm thick. The composite nanofiber sheet where the first conformal metal layer is approximately 5 nm thick. The composite nanofiber sheet further including a second conformal metal layer deposited on the first conformal metal layer. The composite nanofiber sheet where the second conformal metal layer is a silver layer. The composite nanofiber sheet where the second conformal metal layer is from 10 nm to 500 nm thick.

COMPOSITE NANOFIBER SHEET

RELATED APPLICATIONS

The present application is a continuation application under 35 U.S.C. § 111(a) of PCT Application No. US2016/51672 filed on Sep. 14, 2016, which claims priority to Provisional Application No. 62/383,017 filed Sep. 2, 2016 and Japanese Patent Application No. 2015-180950 filed on Sep. 14, 2015, all of which are incorporated herein in their entireties.

TECHNICAL FIELD

The present disclosure relates generally to nanofibers. Specifically, the present disclosure relates to a composite nanofiber sheet.

BACKGROUND

Nanofibers are known to have unusual mechanical, optical, and electronic properties. However, devising embodiments of nanofibers that are commercially useful (e.g., can be manipulated and/or integrated into an application) has been challenging because of the nanoscale dimensions of the nanofibers. PCT Publication No. WO 2007/015710 is one example of an advance in developing commercially useful embodiments of nanofibers. This publication describes converting a nanofiber "forest" into a nanofiber sheet and/or yarn. The nanofiber sheets and yarns may then be applied in a variety of contexts.

SUMMARY

One example of the present disclosure includes a composite nanofiber sheet including: a nanofiber sheet having a first major surface and a second major surface opposite the first major surface, the nanofiber sheet including a plurality of aligned nanofibers that define a plurality of spaces between the aligned nanofibers of the plurality; a first conformal metal layer conformally disposed on outer surfaces of a first portion of the plurality of aligned nanofibers proximate to the first major surface of the nanofiber sheet, the first conformal metal layer including a conductive path in the nanofiber sheet; and a polymer layer disposed in a plurality of spaces defined by a second portion of the plurality of aligned nanofibers, the polymer layer proximate to the second major surface of the nanofiber sheet.

Implementations may include one or more of the following features. The composite nanofiber sheet where the polymer layer is an adhesive layer. The composite nanofiber sheet where the adhesive layer is also disposed proximate to at least a portion of the first major surface of the nanofiber sheet, the composite nanofiber sheet thus forming a conductive double-sided pressure sensitive adhesive nanofiber tape. The composite nanofiber sheet further including an elastic substrate on which the nanofiber sheet, the first conformal metal layer, and the polymer layer are disposed. The composite nanofiber sheet where the elastic substrate, the nanofiber sheet, the first conformal metal layer, and the polymer layer collectively have a first length in a contracted state and a second length up to approximately seven times the first length in an extended state. The composite nanofiber sheet where a sheet resistance of the composite nanofiber sheet in the contracted state is approximately the same as a sheet resistance in the extended state. The composite nanofiber sheet where a thickness of the composite nanofiber sheet is less than 30 □m. The composite nanofiber sheet further including a solder contact connected to the first major surface via the first conformal metal layer. The composite nanofiber sheet further including an electrical conductor connected to the solder contact. The composite nanofiber sheet where the first conformal metal layer is a carbide-forming metal layer. The composite nanofiber sheet where the carbide-forming metal is titanium. The composite nanofiber sheet where the first conformal metal layer is less than 30 nm thick. The composite nanofiber sheet where the first conformal metal layer is approximately 5 nm thick. The composite nanofiber sheet further including a second conformal metal layer deposited on the first conformal metal layer. The composite nanofiber sheet where the second conformal metal layer is a silver layer. The composite nanofiber sheet where the second conformal metal layer is from 10 nm to 500 nm thick.

One example of the present disclosure includes a method for fabricating a composite nanofiber sheet, the method including: providing a nanofiber sheet including a plurality of aligned nanofibers defining a plurality of spaces between the nanofibers of the plurality, the nanofiber sheet having a first major surface and a second major surface opposite the first major surface; placing the second major surface of the densified nanofiber sheet on a release liner having a surface energy of from 25 dynes/cm to 35 dynes/cm; placing an elastic substrate on the first major surface of the densified nanofiber sheet; and removing the release liner from the second major surface of the nanofiber sheet.

The method further including infiltrating a polymer into the second major surface of the nanofiber sheet. The method where the polymer is an adhesive. The method where infiltrating the polymer into the second major surface includes infiltrating at least some of the polymer from the second major surface to the first major surface of the nanofiber sheet. The method further including disposing a polymer sheet on the second major surface of the nanofiber sheet. The method where the polymer sheet is a double-sided adhesive sheet. The method where the elastic substrate on which the nanofiber sheet is placed is in an extended state having a length approximately seven times greater than a length in a contracted state of the densified nanofiber sheet. The method further including applying a first conformal metal layer of a carbide-forming metal at the first major surface of the nanofiber sheet. The method further including applying solder to the first major surface of the nanofiber sheet. The method where the first conformal metal layer, the nanofiber sheet, and the infiltrated polymer form a double sided adhesive nanofiber tape that is electrically conductive.

BRIEF DESCRIPTION OF THE DRAWINGS

FIG. 5 is a method flow diagram illustrating an example method for fabricating a nanofiber sheet, in an embodiment.

FIGS. 6A-6D are transmission electron microscope (TEM) images showing carbon nanofibers on which a conformal titanium metal layer has been deposited, in an embodiment.

Figure 1:
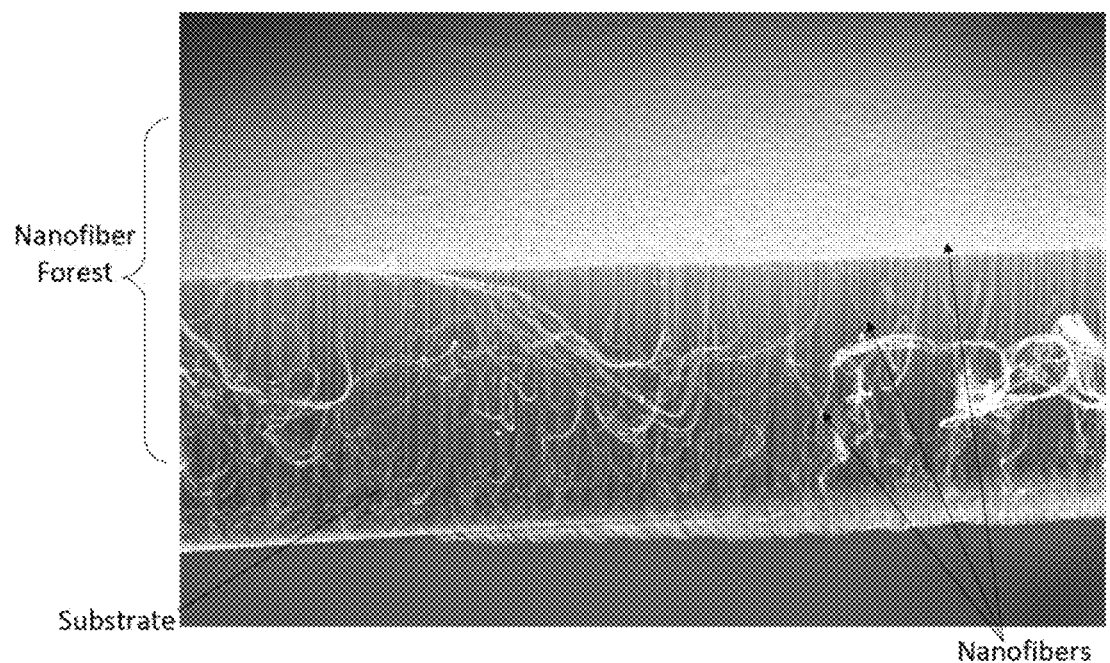
FIG. 1 illustrates an example forest of nanofibers on a substrate, in an embodiment.

The figures depict various embodiments of the present disclosure for purposes of illustration only. Numerous variations, configurations, and other embodiments will be apparent from the following detailed discussion.

DETAILED DESCRIPTION

Overview

Embodiments described herein include composite nanofibers sheets that have been "infiltrated" with a polymer (i.e., the polymer has flowed past a surface of the nanofiber sheet and into at least some of spaces within the sheet defined by the nanofibers), thus forming a polymer layer within the composite nanofiber sheet. When the infiltrating polymer is an adhesive, some embodiments described herein form a single-sided or double-sided adhesive nanofiber tape. This tape can be used in a variety of applications, including as electromagnetic interference shielding (EMI) because it can be conformally adhered to an underlying surface or between two surfaces (e.g., at a seam between two parts of a housing). In other embodiments described herein, some portions of nanofibers in the nanofiber sheet are conformally coated with at least one metal layer ("metallized") and subsequently treated with a polymer. Embodiments that have been metallized may also be infiltrated with an adhesive polymer, such as a pressure sensitive adhesive, to form a highly conductive nanofiber adhesive tape that is either single-sided or double-sided. Other, non-adhesive polymers may also be used to infiltrate the composite nanofiber sheet.

Embodiments described below also include methods for fabricating composite nanofiber sheets that possess a combination of physical, chemical, and electrical properties of their constituents, which include one or more of a nanofiber sheet, at least one conformal metal layer, and a polymer.

Properties of Carbon Nanofibers and Carbon Nanofiber Sheets

As used herein, the term "nanofiber" means a fiber having a diameter less than 1 μm. While the embodiments herein are primarily described as fabricated from carbon nanotubes, it will be appreciated that other carbon allotropes, whether graphene, micron or nano-scale graphite fibers and/or plates, and even other compositions of nano-scale fibers such as boron nitride may be used to fabricate nanofiber sheets using the techniques described below. As used herein, the terms "nanofiber" and "carbon nanotube" encompass both single walled carbon nanotubes and/or multi-walled carbon nanotubes in which carbon atoms are linked together to form a cylindrical structure. In some embodiments, carbon nanotubes as referenced herein have between 4 and 10 walls. As used herein, a "nanofiber sheet" or simply "sheet" refers to a sheet of nanofibers aligned via a drawing process (as described in PCT Publication No. WO 2007/015710, and incorporated by reference herein in its entirety) so that a longitudinal axis of a nanofiber of the sheet is parallel to a major surface of the sheet, rather than perpendicular to the major surface of the sheet (i.e., in the as-deposited form of the sheet, often referred to as a "forest").

The dimensions of carbon nanotubes can vary greatly depending on production methods used. For example, the diameter of a carbon nanotube may be from 0.4 nm to 100 nm and its length may range from 10 μm to greater than 55.5 cm. Carbon nanotubes are also capable of having very high aspect ratios (ratio of length to diameter) with some as high as 132,000,000:1 or more. Given the wide range of dimensional possibilities, the properties of carbon nanotubes are highly adjustable, or "tunable." While many intriguing properties of carbon nanotubes have been identified, harnessing the properties of carbon nanotubes in practical applications requires scalable and controllable production methods that allow the features of the carbon nanotubes to be maintained or enhanced.

Due to their unique structure, carbon nanotubes possess particular mechanical, electrical, chemical, thermal and optical properties that make them well-suited for certain applications. In particular, carbon nanotubes exhibit superior electrical conductivity, high mechanical strength, good thermal stability and are also hydrophobic. In addition to these properties, carbon nanotubes may also exhibit useful optical properties. For example, carbon nanotubes may be used in light-emitting diodes (LEDs) and photo-detectors to emit or detect light at narrowly selected wavelengths. Carbon nanotubes may also prove useful for photon transport and/or phonon transport.

Nanofiber Forest

In accordance with various embodiments of the subject disclosure, nanofibers (including but not limited to carbon nanotubes) can be arranged in various configurations, including in a configuration referred to herein as a "forest." As used herein, a "forest" of nanofibers or carbon nanotubes refers to an array of nanofibers having approximately equivalent dimensions that are arranged substantially parallel to one another on a substrate. FIG. 1 shows an example forest of nanofibers on a substrate. The substrate may be any shape but in some embodiments the substrate has a planar surface on which the forest is assembled. As can be seen in FIG. 1, the nanofibers in the forest may be approximately equal in height and/or diameter.

Nanofiber forests as disclosed herein may be relatively dense. Specifically, the disclosed nanofiber forests may have a density of at least 1 billion nanofibers/cm$^2$. In some specific embodiments, a nanofiber forest as described herein may have a density of between 10 billion/cm$^2$ and 30 billion/cm$^2$. In other examples, the nanofiber forest as described herein may have a density in the range of 90 billion nanofibers/cm$^2$. The forest may include areas of high density or low density and specific areas may be void of nanofibers. The nanofibers within a forest may also exhibit inter-fiber connectivity. For example, neighboring nanofibers within a nanofiber forest may be attracted to one another by van der Waals forces.

Example Methods for Producing Nanofiber Forests

Various methods can be used to produce nanofiber forests in accordance with the present disclosure. For example, in some embodiments nanofibers may be grown in a high-temperature furnace. In some embodiments, catalyst may be deposited on a substrate, placed in a reactor and then may be exposed to a fuel compound that is supplied to the reactor. Substrates can withstand temperatures of greater than 800° C. to 1000° C. and may be inert materials. The substrate may comprise stainless steel or aluminum disposed on an underlying silicon (Si) wafer, although other ceramic substrates may be used in place of the Si wafer (e.g., alumina, zirconia, SiO2, glass ceramics). In examples where the nanofibers of the forest are carbon nanotubes, carbon-based compounds, such as acetylene may be used as fuel compounds. After being introduced to the reactor, the fuel compound(s) may then begin to accumulate on the catalyst and may assemble by growing upward from the substrate to form a forest of nanofibers.

Figure 2:
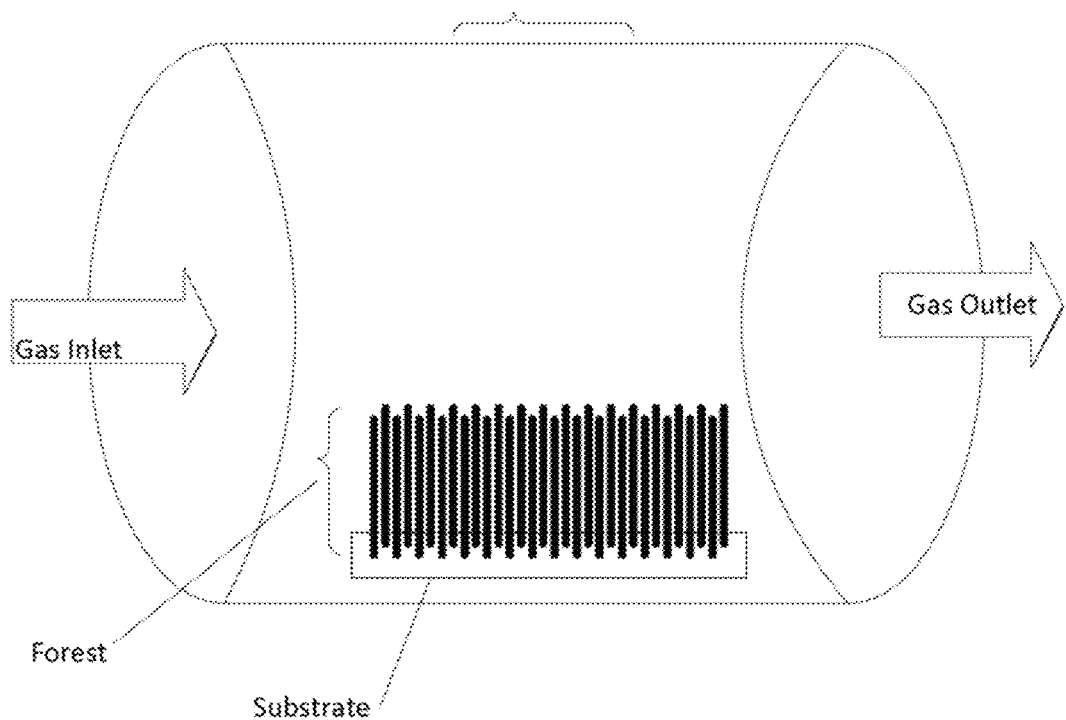
FIG. 2 is a schematic diagram of a reactor for growing nanofibers, in an embodiment.

A diagram of an example reactor for nanofiber growth is shown in FIG. 2. As can be seen in FIG. 2, the reactor may include a heating zone where a substrate can be positioned to facilitate nanofiber forest growth. The reactor also may include a gas inlet where fuel compound(s) and carrier gases may be supplied to the reactor and a gas outlet where expended fuel compounds and carrier gases may be released from the reactor. Examples of carrier gases include hydrogen, argon, and helium. These gases, in particular hydrogen, may also be introduced to the reactor to facilitate growth of the nanofiber forest. Additionally, dopants to be incorporated in the nanofibers may be added to the gas stream. Example methods of adding dopants during deposition of the nanofiber forest are described at paragraph 287 of PCT Publication No. WO 2007/015710 and are incorporated by reference herein. Other example methods of doping or providing an additive to the forest include surface coating, dopant injection, or other deposition and/or in situ reactions (e.g., plasma-induced reactions, gas phase reaction, sputtering, chemical vapor deposition). Example additives include polymers (e.g., poly(vinyl alcohol), poly(phenylene tetrapthalamide) type resins, poly(p-phenylene benzobisoxazole), polyacrylonitrile, poly(styrene), poly(ether etherketone) and poly(vinyl pyrrodidone, or derivations and combinations thereof), gases of elements or compounds (e.g., fluorine), diamond, palladium and palladium alloys, among others.

The reaction conditions during nanofiber growth can be altered to adjust the properties of the resulting nanofiber forest. For example, particle size of the catalyst, reaction temperature, gas flow rate and/or the reaction time can be adjusted as needed to produce a nanofiber forest having the desired specifications. In some embodiments, the position of catalyst on the substrate is controlled to form a nanofiber forest having a desired pattern. For example, in some embodiments catalyst is deposited on the substrate in a pattern and the resulting forest grown from the patterned catalyst is similarly patterned. Exemplary catalysts include iron with a buffer layer of silicon oxide (SiO$_2$) or aluminum oxide (Al$_2$O$_3$). These may be deposited on the substrate using chemical vapor deposition (CVD), pressure assisted chemical vapor deposition (PCVD), electron beam (eBeam) deposition, sputtering, atomic layer deposition (ALD), laser assisted CVD, plasma enhanced CVD, thermal evaporation, various electrochemical methods, among others.

After formation, the nanofiber forest may optionally be modified. For example, in some embodiments, the nanofiber forest may be exposed to a treatment agent such as an oxidizing or reducing agent. In some embodiments, the nanofibers of the forest may optionally be chemically functionalized by a treatment agent. A treatment agent may be introduced to the nanofiber forest by any suitable method, including but not limited to chemical vapor deposition (CVD) or any of the other techniques and additives/dopants presented above. In some embodiments, the nanofiber forest may be modified to form a patterned forest. Patterning of the forest may be accomplished, for example, by selectively removing nanofibers from the forest. Removal can be achieved through chemical or physical means.

Nanofiber Sheet

In addition to arrangement in a forest configuration, the nanofibers of the subject application may also be arranged in a sheet configuration. As used herein, the term "nanofiber sheet," "nanotube sheet," or simply "sheet" refers to an arrangement of nanofibers where the nanofibers are aligned end to end in a plane. In some embodiments, the sheet has a length and/or width that is more than 100 times greater than the thickness of the sheet. In some embodiments, the length, width or both, are more than $10^3$, $10^6$ or $10^9$ times greater than the average thickness of the sheet. A nanofiber sheet can have a thickness of, for example, between approximately 5 nm and 30 µm and any length and width that are suitable for the intended application. In some embodiments, a nanofiber sheet may have a length of between 1 cm and 10 meters and a width between 1 cm and 1 meter. These lengths are provided merely for illustration. The length and width of a nanofiber sheet are constrained by the configuration of the manufacturing equipment and not by the physical or chemical properties of any of the nanotubes, forest, or nanofiber sheet. For example, continuous processes can produce sheets of any length. These sheets can be wound onto a roll as they are produced.

Figure 3:
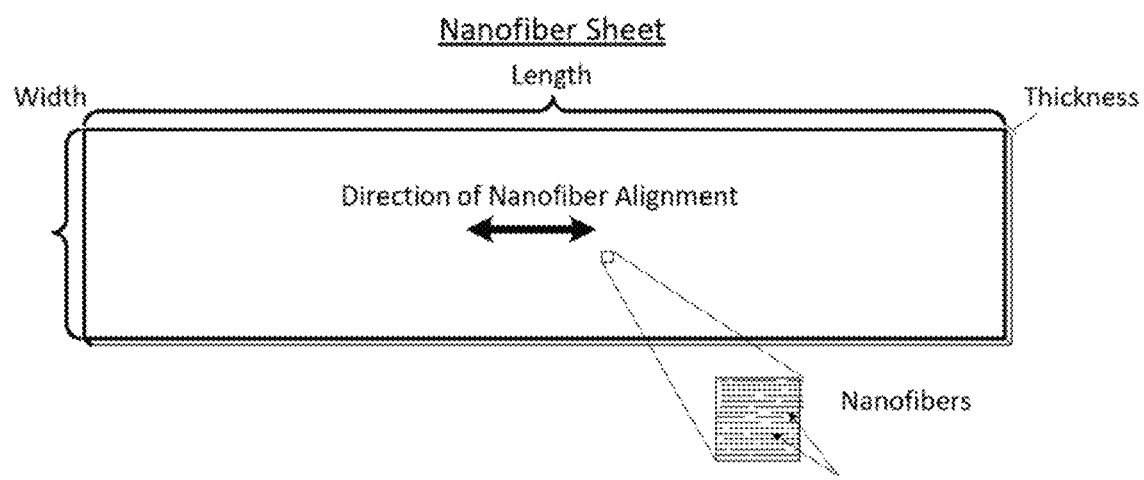
FIG. 3 is an illustration of a nanofiber sheet that identifies relative dimensions of the sheet and schematically illustrates nanofibers within the sheet aligned end-to-end in a plane parallel to a surface of the sheet, in an embodiment.

An illustration of an example nanofiber sheet is shown in FIG. 3 with relative dimensions illustrated. As can be seen in FIG. 3, the axis in which the nanofibers are aligned end-to end is referred to as the direction of nanofiber alignment. In some embodiments, the direction of nanofiber alignment may be continuous throughout an entire nanofiber sheet. Nanofibers are not necessarily perfectly parallel to each other and it is understood that the direction of nanofiber alignment is an average or general measure of the direction of alignment of the nanofibers.

Nanofiber sheets may be stacked on top of one another to form a multi-layered sheet stack. Nanofiber sheets may be stacked to have the same direction of nanofiber alignment or to have different directions of nanofiber alignment. Any number of nanofiber sheets may be stacked on top of one another to form a multi-layered nanofiber sheet stack. For example, in some embodiments, a nanofiber sheet stack may include 2, 3, 4, 5, 10, or more individual nanofiber sheets. The direction of nanofiber alignment between adjoining sheets in a stack may differ by less than 1°, less than 5° or less than 10°. In other embodiments, the direction of nanofiber alignment between adjoining or interleaved sheets may differ by more than 40°, more than 45°, more than 60°, more than 80°, or more than 85°. In specific embodiments, the direction of nanofiber alignment between adjoining or interleaved sheets may be 90°. Multi-layer sheet stacks may include other materials such as polymers, metals and adhesives in between individual nonfiber sheets.

Nanofiber sheets may be assembled using any type of suitable process capable of producing the sheet. In some example embodiments, nanofiber sheets may be drawn from a nanofiber forest. An example of a nanofiber sheet being drawn from a nanofiber forest is shown in FIG. 4.

Figure 4:
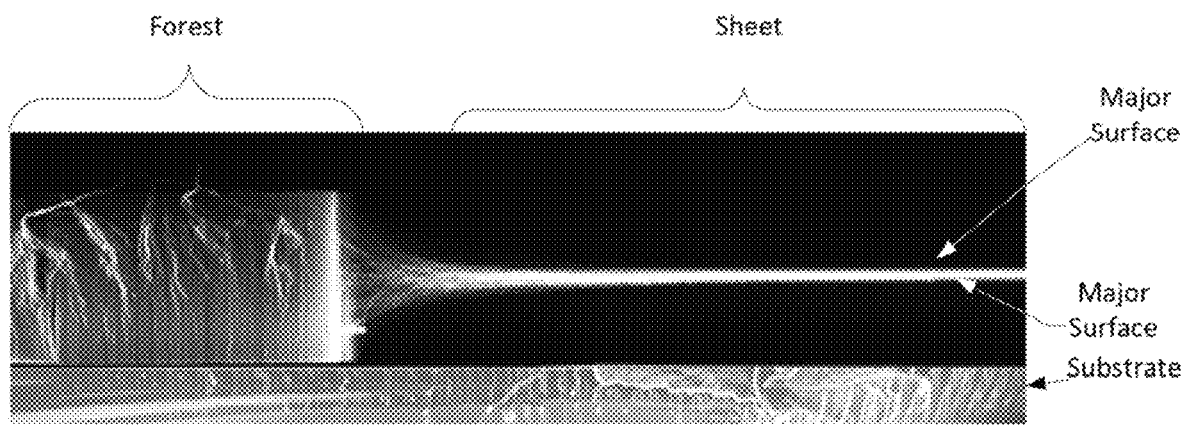
FIG. 4 is an image of a nanofiber sheet being laterally drawn from a nanofiber forest, the nanofibers aligning from end-to-end as schematically shown in FIG. 3.
Figure 6C:
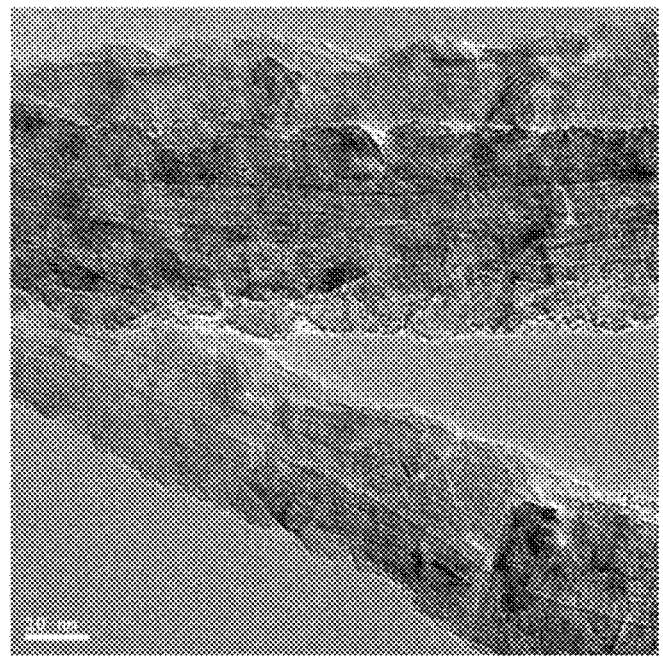
Figure 6D:
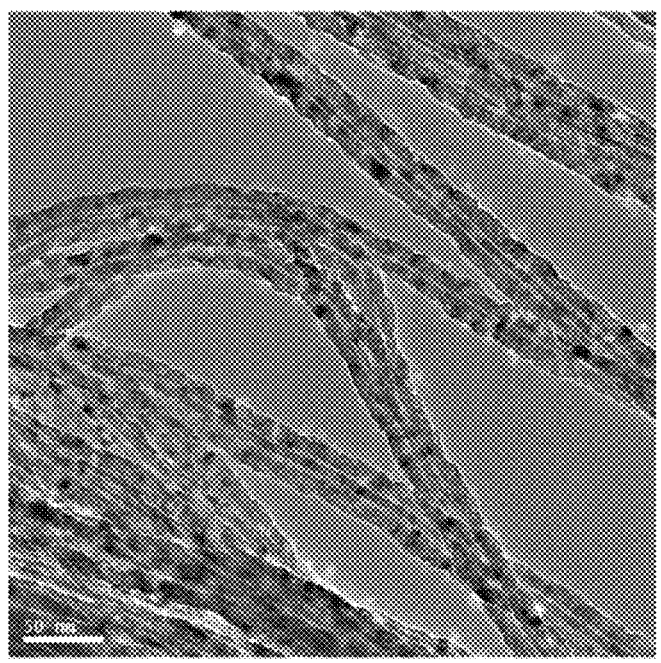
Figure 7A:
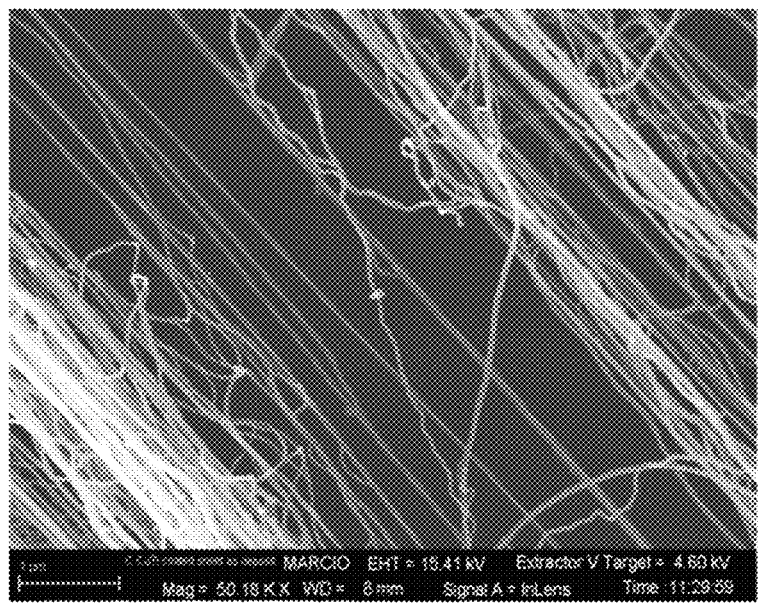
FIGS. 7A-7D are TEM images showing carbon nanofibers on which a first conformal metal layer of titanium and a second conformal metal layer of copper have been deposited, in an embodiment.
Figure 7B:
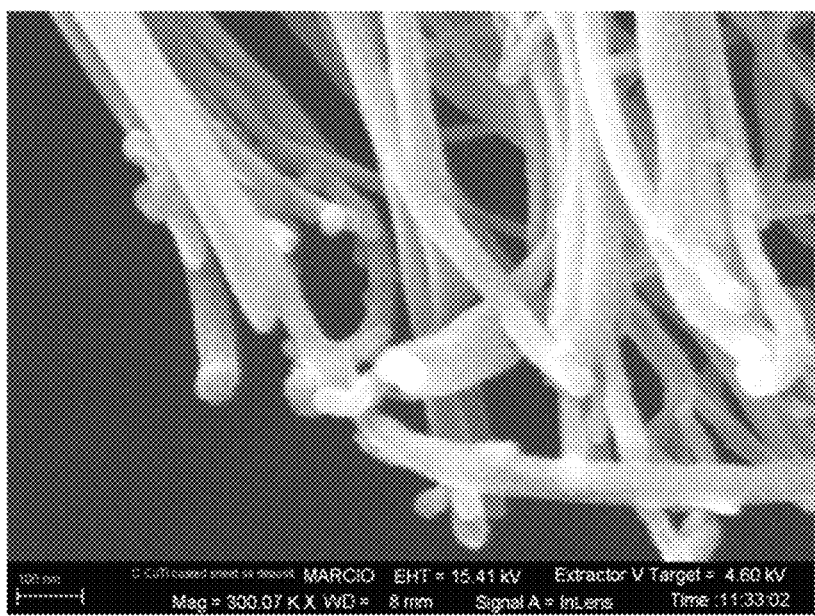
Figure 7C:
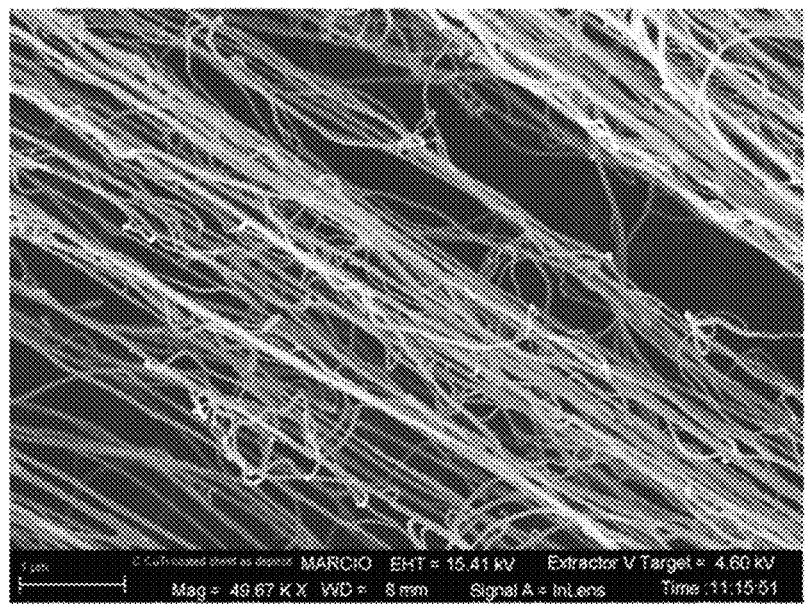
Figure 7D:
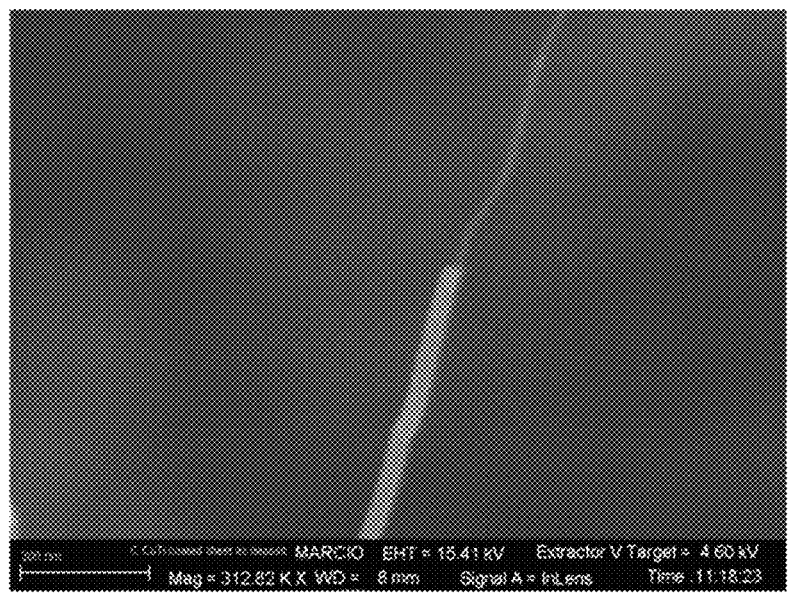

As can be seen in FIG. 4, the nanofibers may be drawn laterally from the forest and then align end-to-end to form a nanofiber sheet. In embodiments where a nanofiber sheet is drawn from a nanofiber forest, the dimensions of the forest may be controlled to form a nanofiber sheet having particular dimensions. For example, the width of the nanofiber sheet may be approximately equal to the width of the nanofiber forest from which the sheet was drawn. Additionally, the length of the sheet can be controlled, for example, by concluding the draw process when the desired sheet length has been achieved.

Nanofiber sheets have many properties that can be exploited for various applications. For example, nanofiber sheets may have tunable opacity, high mechanical strength and flexibility, thermal and electrical conductivity, and may also exhibit hydrophobicity. Given the high degree of alignment of the nanofibers within a sheet, a nanofiber sheet may be extremely thin. In some examples, a nanofiber sheet is on the order of approximately 10 nm thick (as measured within normal measurement tolerances), rendering it nearly two-dimensional. In other examples, the thickness of a nanofiber sheet can be as high as 200 nm or 300 nm. As such, nanofiber sheets may add minimal additional thickness to a component.

As with nanofiber forests, the nanofibers in a nanofibers sheet may be functionalized by a treatment agent by adding chemical groups or elements to a surface of the nanofibers of the sheet and that provide a different chemical activity than the nanofibers alone. Functionalization of a nanofiber sheet can be performed on previously functionalized nanofibers or can be performed on previously unfunctionalized nanofibers. Functionalization can be performed using any of the techniques described herein including, but not limited to CVD, and various doping techniques.

Nanofiber sheets, prior to metallization and/or polymer infiltration, as disclosed herein may also have high purity, wherein more than 90%, more than 95% or more than 99% of the weight percent of the nanofiber sheet is attributable to nanofibers, in some instances. Similarly, the nanofiber sheet may comprise more than 90%, more than 95%, more than 99% or more than 99.9% by weight of carbon.

Fabricating Conformable, Flexible, Conductive Composite Nanofiber Sheets

The nanofiber sheet, thus having been drawn from a forest or otherwise produced, may then be processed according to embodiments described herein. As indicated above, and described in more detail below, a nanofiber sheet may be "densified" by, for example, using a solvent, and "infiltrated" with a polymer to broaden the physical conditions in which the nanofiber sheet may be applied.

In other embodiments, the infiltrating polymer itself will densify a nanofiber sheet. Using an infiltrating polymer to densify a nanofiber sheet instead of a separate solvent has a number of benefits. These benefits include reduced cost and improved convenience of fabrication because a separate manufacturing step and additional material are omitted from the process.

In one example, described below in more detail, the polymer used to infiltrate the nanofiber sheet is an adhesive. Once fabricated, this embodiment can be used as an elastic, single or double-sided adhesive tape that is optionally electrically conductive. While an unmetallized nanofiber sheet may have a sheet resistance within the range of from 650 to 1200 Ohms/square, a nanofiber sheet metallized with a metal (e.g., gold, platinum, copper or other high work function metal having a work function above about 3.5 eV) may have a sheet resistance of as low or lower than 100 Ohm/square. Furthermore, embodiments that include a metallized layer have an improved ability to receive solder, thus enabling a mechanically and electrically secure electrical connection between the nanofiber sheet and electrical systems (e.g., a sensor, detector, power source).

FIG. 5 is a method flow diagram illustrating an example method 500 for fabricating a nanofiber sheet infiltrated with a polymer. The method 500 begins by providing 504 a nanofiber sheet. The provided nanofiber sheet may be, but is not required to be, prepared according to embodiments described above.

Fabrication of conductive, conformable, flexible, and stretchable structures using nanofiber sheets is accomplished using processing stages that include: (1) depositing one or more nanofiber sheets onto a release liner, leaving one surface of the deposited one or more nanofiber sheets exposed; (2) optionally "metallizing" (i.e., depositing a conformal layer) on some or all of the nanofibers in the nanofiber sheets via the exposed surface; (3) attaching a stretched (i.e., tensile strained) elastic substrate onto the exposed surface of the stack of the sheets; (4) removing the release liner; (4) infiltrating a polymer into the sheets; and (5) optionally releasing the tensile strain imposed on the elastic substrate. Each of these fabrication stages is discussed below in more detail. Some additional, optional, fabrication stages are also discussed below.

For convenience of fabrication, the nanofiber sheet is placed 512 onto a release liner. The release liner acts as a temporary carrier for the sheets so that the sheets can be conveniently manipulated throughout the fabrication process while reducing the risk of damaging the sheet. The release liner has sufficient mechanical integrity to maintain its dimensions and shape during processing, thus minimizing the potential for damage to the nanofiber sheet. The release liner has sufficient adhesion with the nanofiber sheet so that the sheets are securely, but removably, bonded to the release liner. The adhesion between the release liner and the sheets is not so strong that the sheets are unable to be detached from the release liner without damaging the sheet.

Examples of release liners include polymer films such as polypropylene or polyolefin polymer films, such as those applied by the Gunze Plastic Films company of Olathe, Kans. Ranges of surface tensions of polymer films used in examples of release liners include: from 25 dynes/cm to 35 dynes/cm; from 29 dynes/cm to 31 dynes/cm; and from 20 dynes/cm to 40 dynes/cm.

Placing 512 the nanofiber sheet on the release liner can be repeated so that a stack of multiple nanofiber sheets are then disposed on release liner in preparation for further processing.

In embodiments, after one or more nanofiber sheets have been placed 512 onto the release liner, the nanofiber sheets are optionally "metallized" 516. "Metallizing" refers to a process in which one or more metal layers are conformally deposited or otherwise disposed on outer surfaces of the aligned nanofibers within the nanofiber sheet. The conformal metal layer (or layers) are disposed not only on an outer surface of the sheet as a whole, nor only on the outer surfaces of individual carbon nanofibers that are exposed at the outer surface of the nanofiber sheet. Rather, by selecting an appropriate metal and deposition process, the conformal metal layer penetrates, at least partially, beyond a sheet surface to conform to outer surfaces of nanofibers disposed within the sheet itself as well as on nanofibers at the exposed surface of the nanofiber sheet. This deposition can be performed on an individual sheet(s) that are then optionally stacked or performed on an entire stack of nanofiber sheets. Metallizing a nanofiber sheet prior to densifying the nanofiber sheet (an optional step discussed below in more detail) is beneficial in some embodiments because the un-densified nanofiber sheet defines greater spaces between fibers, thus enabling a more uniform distribution of metal on the fiber surfaces both at a surface of the nanofiber sheet and within the body of the nanofiber sheet.

Examples of processes used to deposit a metallization layer include, but are not limited to chemical vapor deposition (CVD), pressure assisted chemical vapor deposition (PCVD), electron beam (eBeam) deposition, sputtering, atomic layer deposition (ALD), electroplating, laser assisted CVD, plasma-enhanced CVD, thermal evaporation, electrochemical methods (such as electroplating), among others. In some examples, metallic nanoparticles are deposited (rather than a conformal layer).

In other examples, non-metallic materials may be deposited using the processes described above in the context of metallization 516. For example, magnesium diboride, semiconductors (e.g., silicon, germanium, II-VI semiconductors, III-V semiconductors), other carbon allotropes (e.g., graphite, diamond, fullerenes), polymers, ceramics (e.g., aluminum oxide, tungsten carbide, silicon dioxide), titanium dioxide, lithium ion phosphate, nanoparticles, nanoflakes, nanowires, among others.

In many cases, carbon complexes, including carbon nanotube sheets, are difficult surfaces on which to adhere metals, particularly for less reactive metals, (e.g., noble metals like gold, silver, copper) due to poor adhesion. To overcome this challenge, a first conformal layer of a carbide-forming metal, such as tungsten, molybdenum, titanium, niobium, among others is first deposited onto the nanotube sheet. Other carbide-forming metals and/or alloys may be used instead of titanium, including iron and zinc, zirconium, hafnium, vanadium, tantalum, chromium, among others. This first conformal layer is, in embodiments any of the following thicknesses: from 1 nm to 10 nm, from 1 nm to 5 nm, from 5 nm to 10 nm, from 2 nm to 8 nm, from 3 nm to 7 nm, from 3 nm to 6 nm, from 6 nm to 9 nm, and from less than 30 nm.

Upon depositing the first conformal layer of a carbide-forming metal, in some examples a second conformal layer is deposited on the first conformal layer. Because the second conformal layer adheres to the first conformal layer, any of a variety of metals and metal alloys may be used including, but not limited to gold, silver, copper, nickel, palladium, aluminum, iron, tin, and alloys thereof. The second conformal layer is, in embodiments, any of the following thicknesses: from 10 nm to 300 nm, from 10 nm to 100 nm, from 10 nm to 200 nm, from 100 nm to 200 nm, from 200 nm to 300 nm, from 150 nm to 250 nm, among others.

One benefit of a conformal metal layer that is disposed on nanofiber surfaces interior to the nanofiber sheet is that many individual nanofiber surfaces are coated with metal. This reduces the resistivity of the sheet because there are many possible conductive pathways throughout the sheet, not only a few conductive pathways proximate to an outer surface of the sheet.

Another benefit of a conformal metal layer is that the conductivity of the sheet is preserved even upon infiltration of the sheet by an insulating polymer from either side of the sheet (as is described below). Because many of the electrical contacts created upon metallization of the sheet are above, below or non-planar with the surface, some electrical connections between nanofibers remain even upon infiltration of an electrically insulating polymer into portions of a metallized layer in the sheet. However, due to, for example, surface energy differences between nanofibers and metals, polymers generally, and adhesives specifically, prefer contact with carbon nanotubes over metal. As a result, metallized portions of a nanotube sheet may resist polymer infiltration, thus preserving a conductive pathway into the sheet even though polymer has infiltrated from one major surface to portions of an opposite major surface of the sheet. In this case, the polymer layer is proximate to a second major surface of the nanofiber composite sheet, opposite to the major surface proximate to the metallized portions of the nanotube sheet.

FIGS. 6A-6D are images captured using Transmission Electron Microscopy (TEM) that show a carbon nanotube over which a first conformal metal layer of titanium is disposed. In the examples shown, the first conformal metal layer of titanium is approximately 3 nm thick (with variation due to normal measurement tolerances) and was deposited on the nanotube using eBeam deposition. In other examples, the first conformal metal layer can be from 1 nm thick to 10 nm thick.

For example, metal was deposited onto a nanofiber sheet using an electron beam evaporation system from CHA Industries ("CHA Mark 50" model) of Fremont, Calif. The deposition was performed at an operating voltage of approximately 10 kW (approximated by normal measuring tolerances due to measurement discrimination, accuracy, and precision) in a vacuum of from approximately $10^{-6}$ to approximately $10^{-7}$ torr (approximated by normal measuring tolerances due to measurement discrimination, accuracy, and precision). The eBeam deposition system was equipped with a turret that allows changing between deposition metals automatically. Samples were attached to the dome-shape sample holder following the curvature of the dome to assure the uniform metal layer through the whole sample. The deposition rates of titanium and then silver metals were kept constant by a deposition controller at levels around 0.5 Å/s and 10 Å/s respectively. The titanium thin film deposited was from 3 to 20 nm thick, while silver metal thickness was between 400 nm and 500 nm thick.

In a separate example from the experimental example described above, FIGS. 7A-7D show TEM images of a second conformal layer of copper that is approximately 60 nm thick (the approximation due to normal process variation and measurement error) disposed over a first conformal metal layer of titanium deposited using eBeam deposition. The combination of the first conformal layer of titanium and the second conformal layer of copper, as embodied in the examples shown in these figures, produced a nanofiber sheet with a resistance of approximately 5 Ohms/square (within normal measurement tolerances).

Figure 8:
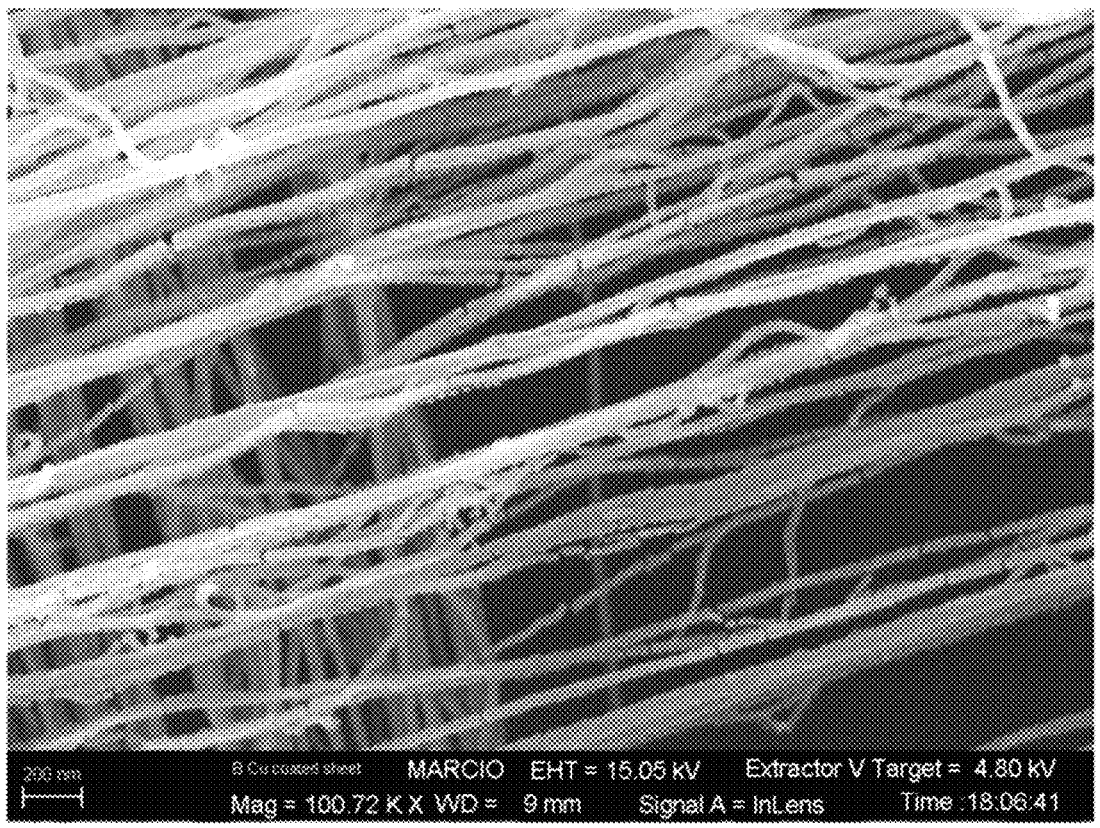
FIG. 8 is a TEM image showing carbon nanofibers on which a conformal layer of copper has been deposited, without a first conformal layer of a carbide-forming metal between the carbon nanofiber and the copper layer.

The morphology of the examples in FIGS. 7A-7D is in contrast to the morphology of other examples in which the first conformal metal layer of a carbide-forming metal is absent. As shown in the TEM image of FIG. 8, an approximately 60 nm thick copper layer has been conformally deposited on the nanofibers using eBeam deposition without an underlying carbide-forming first conformal layer. As shown, the non-carbide-forming copper conformal metal layer has many discontinuities. This morphology has an impact on electrical properties as well. The resistance of the embodiment shown in FIG. 8 was measured to be 1790 Ohms, nearly 600 times greater than the embodiments of FIGS. 7A-7D.

The first conformal layer and the second conformal layer may each be deposited by any thin film deposition technique, including but not limited to electronic beam deposition (EBM), sputtering, evaporative deposition, among others. Regardless, deposition of a first conformal metal layer (of a carbide-forming metal) followed by deposition of a second conformal metal layer. Upon depositing the first and second conformal layers, a sheet resistance of a nanofiber sheet can be as low as approximately 100 Ohms/square (within normal measurement tolerances). Absent these conformal metal layers, a sheet resistance of a nanofiber sheet is in the range of from 650 Ohms/square to 1200 Ohms/square.

In other embodiments, rather than depositing the metal layers as describe above, the nanofiber sheets can be left in their un-metallized state.

Regardless of whether or not the sheets have been metallized, the sheets are transferred 520 from the release liner to an elastic substrate. Elastic substrates are particularly helpful in the fabrication of sheets that can later be strained or extended, in some cases, up to seven times (700%) of the original length of un-strained length of the substrate. Transferring 520 of the metallized nanofiber sheets from the release liner to the elastic substrate is performed by simply contacting the elastic substrate at an exposed surface of the metallized nanofiber sheet (i.e., a surface opposite that in contact with the release liner). If the release liner and the elastic substrate have been selected so that the adhesion between the nanofiber sheet and the elastic substrate is greater than the adhesion between the nanofiber sheet and the release liner, the release liner is removed 524 from the nanofiber sheet by simply peeling it from the nanofiber sheet. The nanofiber sheet will remain attached to the elastic substrate.

Examples of elastic substrates with these features include silicone rubber films, such as platinum catalyzed silicone polymer films. One embodiment of a platinum catalyzed silicone polymer film is Eco-Flex® sold by Smooth-On® of Macungie, Pa. Ranges of surface tensions of polymer films used in examples of release liners include: from 15 dynes/cm to 25 dynes/cm; from 20 dynes/cm to 24 dynes/cm; and from 23 dynes/cm to 25 dynes/cm.

Figure 9:
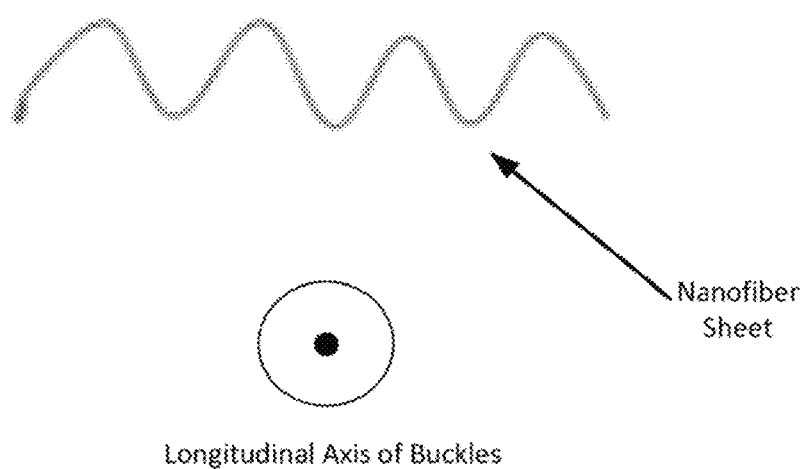
FIG. 9 is a schematic illustration of a "buckled" nanofiber sheet, in an embodiment.

In some examples, the elastic substrate has a tensile strain imposed on it (i.e., is "stretched" or "extended") prior to attachment of the nanofiber sheet. Straining the elastic substrate enables the nanofiber sheet to "buckle" when the strain on the elastic substrate is released (i.e., the substrate is "relaxed" or allowed to contract to a "contracted state" from its elastically strained or "extended" state) after additional processing that is described below. A buckled nanofiber sheet is schematically illustrated in FIG. 9. Buckling the nanofiber sheet "stores" additional surface area of the sheet, facilitating repeated subsequent elastic extensions of both the elastic substrate and the nanofiber sheet disposed on the elastic substrate, without damaging the nanofiber sheet. Thus, the nanofiber sheet is able to stretch because of the structure of the sheet, not due to any elasticity of the fibers themselves.

Figure 10A:
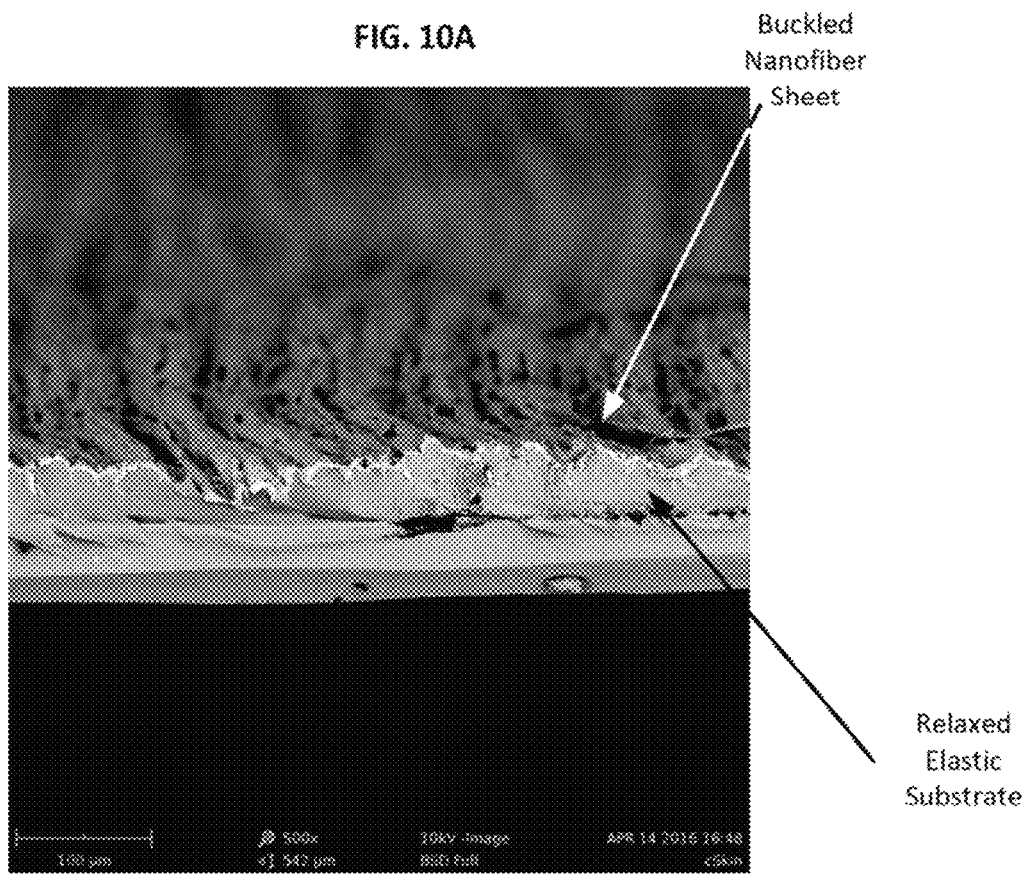
FIGS. 10A and 10B are cross-sectional SEM images showing a metallized nanofiber sheet, infiltrated by a polymer, and disposed on an elastic substrate, the nanofiber sheet having a buckled surface, in an embodiment.
Figure 10B:
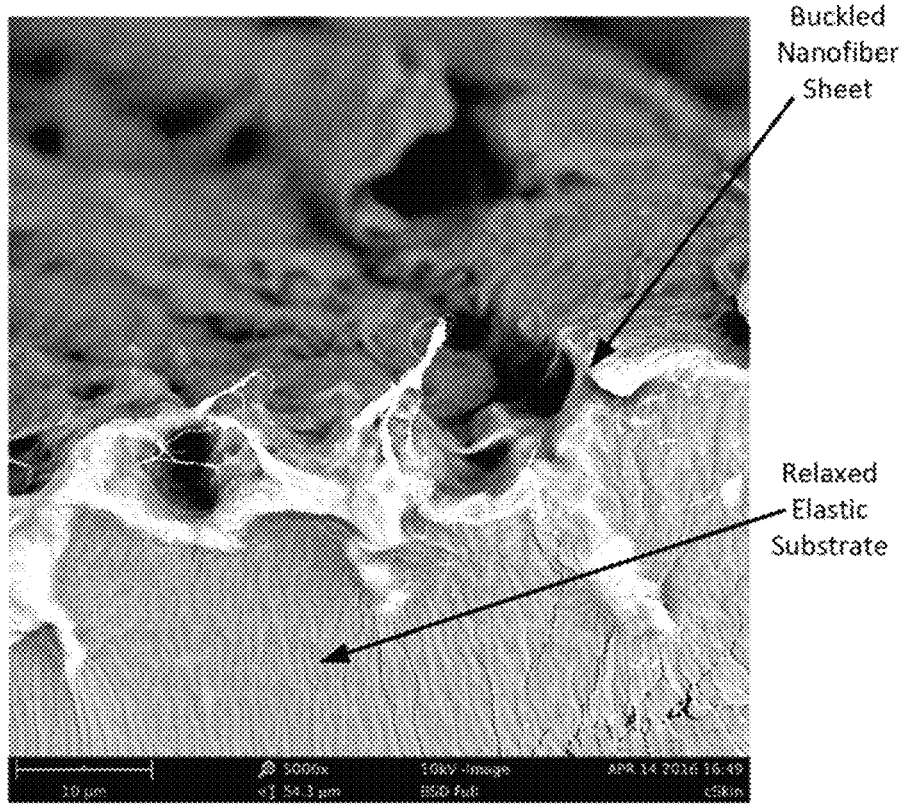
Figure 10C:
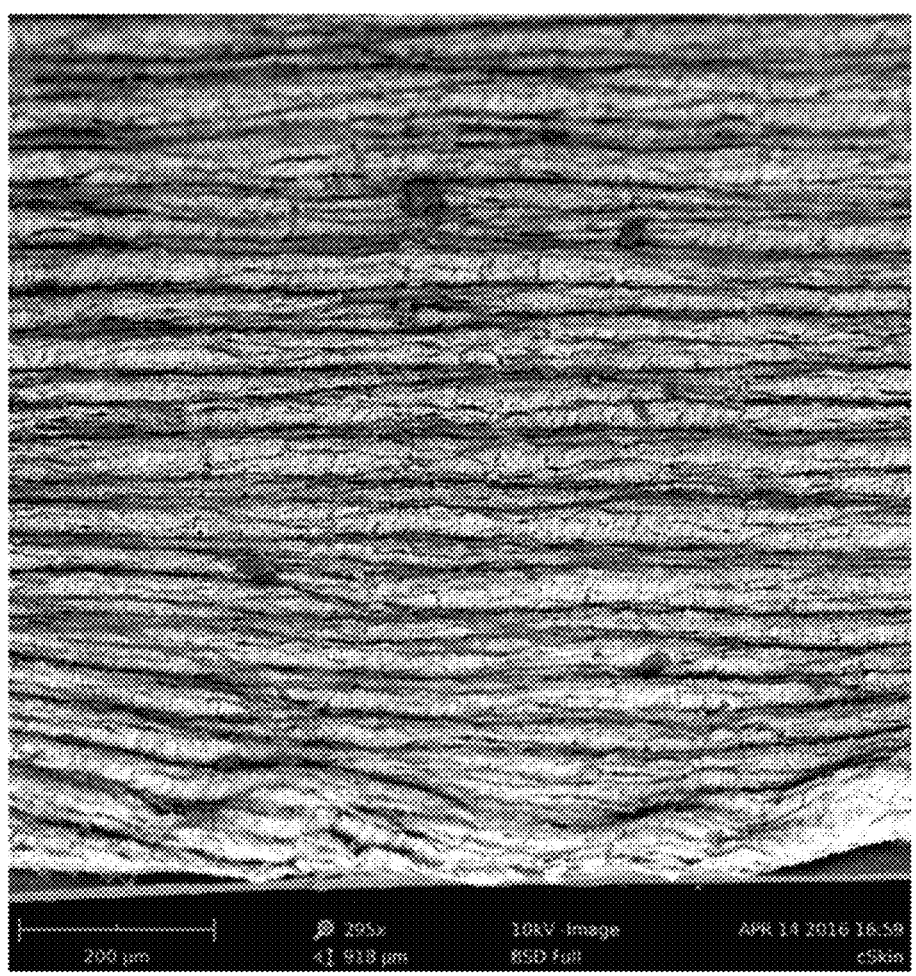
FIG. 10C is a top view SEM image showing a metallized nanofiber sheet, infiltrated by a polymer, disposed on an elastic substrate, and having a buckled surface, in an embodiment.

Images of a buckled nanofiber sheets on underlying elastic substrates appear in FIGS. 10A-10C. FIGS. 10A and 10B are cross-sectional views captured using a scanning electron microscope (SEM). As is shown, the adhesion between the nanofiber sheet and the underlying elastic substrate is sufficient to maintain contact between the nanofiber sheet and the elastic substrate even in the buckled conformation. FIG. 10C is a top view of a buckled nanofiber sheet attached to an underlying, relaxed elastic substrate. While not shown, it will be understood that the elastic substrate and the buckled nanofiber sheet disposed thereon may be elastically strained again without damage to the nanofiber sheet. This is because additional length of the nanofiber sheet is stored in the buckles and is used to accommodate a strain applied in a direction transverse to a longitudinal axis of the buckles (shown in FIG. 9).

In some embodiments, one or more nanofiber sheets can be disposed on one or more elastic substrates that have been strained in multiple directions simultaneously (e.g., isotropically as though on an expanding sphere). In these examples, multiple different directions of strain can be accommodated by buckles that are not merely longitudinal but have a configuration reflective of multi-axial strain. In some embodiments, nanofibers sheets are disposed on substrates tensile strained individually as described above in the context of FIG. 9. These individual nanofiber sheets are then progressively stacked with an offset between the longitudinal axes of adjacent sheets, thus being configured to accommodate different directions of strain. For example, one or more longitudinally strained nanofiber sheets can be stacked, each with a 1°, 2°, 5°, 10°, 90°, or other angle of difference in orientation with respect to neighboring layers. This systematic variation of orientation between layers is described above as a variation in "a direction of nanofiber alignment." Regardless, the stack as a whole may then accommodate strains that have more than one directional component or be adhered to a curved surface (e.g., a surface of a ball or a corner of an electronic device). This process of straining and stacking may occur prior to infiltration, as described below. Or this process of straining and stacking may occur after infiltration of each individual nanofiber sheet.

Figure 11:
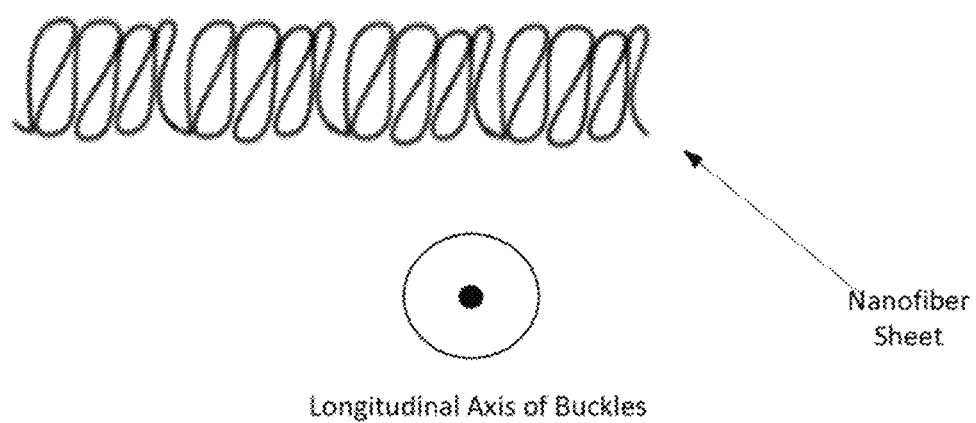
FIG. 11 is a schematic illustration of an "over-buckled" nanofiber sheet in which the extent of buckling causes shorts in a conductive path of the sheet, in an embodiment.
Figure 12A:
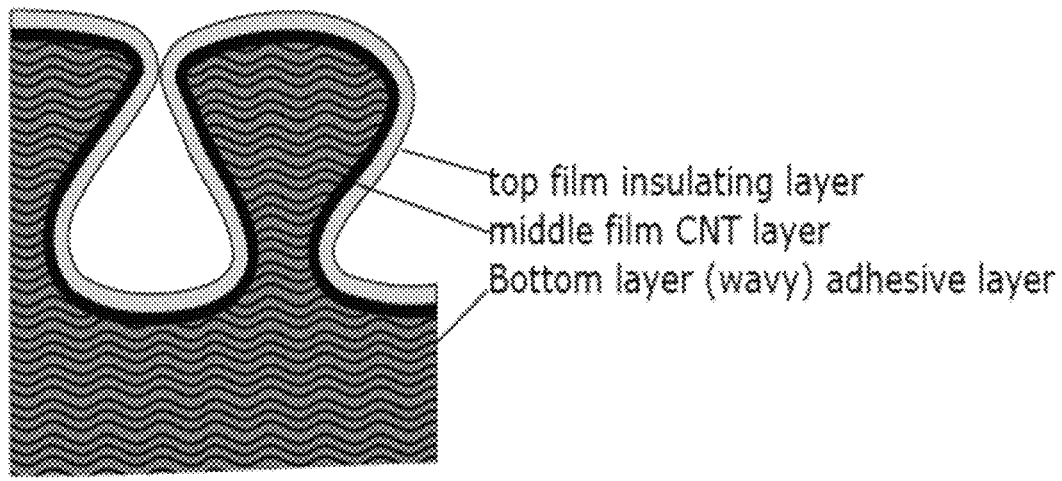
FIGS. 12A and 12B are schematic illustrations of an "over-buckled" nanofiber sheet that includes a top film insulating layer that prevents shorting between adjacent buckles that are in contact, in an embodiment.
Figure 12B:
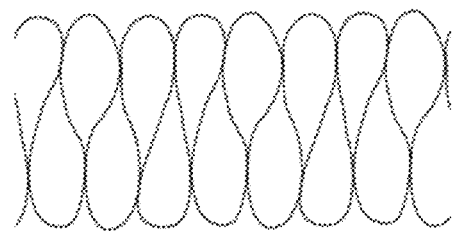

The extent of buckling can be varied beyond that shown schematically in FIG. 9. As shown in FIG. 11, if an underlying elastic substrate is stretched enough during the transferring 520 of the nanofiber sheet to the elastic substrate, this can cause "over-buckling" of the nanofiber sheet upon relaxation of the elastic substrate. When over-buckled, a nanofiber sheet will buckle enough so that some or all of the individual buckles contact one another. This "over-buckling" then creates electrical short circuits within the nanofiber sheet, lowering the electrical resistance of the sheet compared to a buckled configuration (shown in FIG. 9) or an unbuckled sheet. Changes in electrical resistance can be enhanced by configuring a metallized major surface to correspond to the buckled major surface. In this way, an over-buckled sheet has a lowered resistance compared to a non-over buckled sheet. Over-buckled sheets can obtain elongations even beyond 700% (up to 1000%) in some examples. Furthermore, as schematically illustrated in FIGS. 12A and 12B, an insulating film or insulating polymer can be used to infiltrate the buckled surface or alternatively applied separately to a metallized surface (proximate at least one of the first major surface and the second major surface) of a nanofiber sheet. This can reduce conductivity and prevent shorting between adjacent, contacting portions of an over-buckled sheet, thereby combining the extreme elongations with the electrical properties of a normally buckled (i.e., not over-buckled) sheet or unbuckled sheet.

The insulating film or infiltrating polymer can also be selected to provide environmental protection from, for example, moisture (e.g., rain, humidity, sweat), contaminants (e.g., dirt or other particles), UV degradation of an infiltrated polymer, or other environmental degradation. For example, an insulating film can be selected to have hydrophobic properties, a low surface energy, and/or have additives that resist the accumulation of debris, dirt, and other foreign matter.

Regardless of the nature of the strain applied to the elastic substrate (or whether any strain is applied at all), after removing the release liner 524 a polymer is infiltrated 528 into the exposed surface of the nanofiber sheet. Polymer infiltration 528 can be performed by simply applying a polymer or polymer solution to the exposed surface. The polymer will fill some or all of the spaces between, and defined by, the nanofibers of the sheet. The polymer will generally infiltrate up to approximately the metallized layer deposited within the sheet from an opposing surface of the nanofiber sheet, thus forming a polymer layer within the nanofiber sheet. In some examples, some of the polymer can penetrate into the metallized layer to the major surface associated with the metallized layer, as described above.

Examples of polymers used to infiltrate the nanofiber sheet include, but are not limited to acrylics, butyl rubber, natural rubber, copolymers (including styrene copolymers), polyester, silicone, polyvinyl ethers, polymer blends, UV-cured and pressure sensitive adhesives, and others. In some examples, the polymer is an adhesive, such as an acrylic adhesive, or a medical grade adhesive.

In examples in which the elastic substrate has been strained, the strain is released after infiltration of the polymer. This causes the elastic substrate, and the nanofiber sheet, to buckle as described above.

The nanofiber sheet is optionally "densified" 530. "Densification" is a process by which a nanofiber sheet is formed into a denser configuration by applying a liquid or fluid to the as-processed sheet (such as the example shown in FIG. 4). Upon removal of the applied liquid or fluid (e.g., by evaporation, vacuum-assisted removal, or other process), fibers of the nanofiber sheet are drawn toward one another, thus increasing a number of nanofibers per unit volume, and the mass per unit volume of the sheet as a whole. The liquid may be introduced to the nanofiber sheet in any of a variety of ways, including, for example applying the liquid to an exposed surface of the sheet, imbibing the liquid, exposing the sheet to an aerosol of a liquid, vapor condensation, or combinations thereof so that is becomes partially or entirely saturated by the liquid or fluid. Liquids or fluids used for densifying nanofiber sheets may include, in whole or in part, aqueous or non-aqueous solvents, polar or non-polar solvents, protic or aprotic solvents, or combinations thereof. Examples of specific liquids that can be used to densify a nanofiber sheet include, but are not limited to, toluene, styrene, ethanol, ethylene glycol, acetone, methanol, isopropyl alcohol, chloroform, chlorobenzene, and n-methyl pyrrolidone. Mixtures of two, three or more liquids may also be used.

Densification may affect the thickness of the sheet. In some specific examples, a nanofiber sheet may have a thickness of between 10 μm and 20 μm prior to densification and after densification may have a thickness of between 10 nm to 300 nm. Expressed in terms of density, a nanofiber sheet may have a density within the range of from 0.0015 g/cm$^3$ for an experimental example sheet about 18 □m thick before densification. After densification, the volumetric density can increase as much as by a factor of 360. In some examples, a nanofiber sheet (and/or a stack of nanofiber sheets) is densified upon removal of a solvent of a polymer, such as an adhesive polymer, that has infiltrated the nanofiber sheet.

The elastic substrate is then removed 532. In embodiments that have been metallized, the metallized surface is exposed. This metallized surface may be used as a low contact resistance surface to which electrical contacts (e.g., solder contacts) can be attached. The metallization also enables the nanofiber sheet to be compatible with conventional solders, which is not typically the case for nanofiber materials, in particular carbon nanofiber materials. Optionally, another substrate may be adhered to one of either of the exposed surfaces. Regardless, once removed, the polymer infiltrated sheet is less than 1 □m thick, and can be as thin as 20 nm.

Alternative Embodiments

In some examples, dimensions and thickness of embodiments fabricated according to the examples presented above are varied by varying the width of the substrate from which the nanofibers sheets are drawn, the thickness of the nanofiber sheet used to draw the nanofiber sheet, and/or the number of layers of the nanofiber sheets that are stacked on the release layer. Varying the physical dimensions and/or number of layers not only influences the physical properties but also the electrical, mechanical, and optical properties of the nanofiber tape. For example, nanofiber tape having a larger cross-sectional area is more likely to have a lower electrical resistance (all other factors, such as nanofiber sheet composition, adhesive composition, etc.) being equal.

In another variation of the above process, an adhesive strength of an infiltrated adhesive is greater on one major surface of the sheet compared to the opposite major surface. Because one surface is weakly adhesive, the infiltrated nanofiber sheet can be wound into a roll without the need for an intervening removable release liner because the weakly adhering surface can be removed from the more strongly adhering surface.

In other variations of the above processes, areas on one or more nanofiber sheets may be selectively patterned. The pattern may be applied to the synthesis of the forest, so that the nanofiber sheet drawn from the patterned forest has variations in density. The pattern may also be applied to the optional metallization layer and/or the infiltrated polymer so as to control the variation of properties (whether adhesive, electrical or other property) across and throughout the sheet. Alternative techniques for selectively patterning a nanofiber sheet include disposing a plurality of nanofiber sheets on one or more substrates (such as the release liners and/or elastic substrates). In this embodiment, the one or more substrates have a surface area greater than any one of the nanofiber sheets so that the plurality of nanofiber sheets can be arranged in a desired pattern on the one or more substrates.

It will be appreciated that above embodiments and the example applications that follow may be embodied using either single nanofiber sheet composites or multi-layered nanofiber sheet stacks.

Example Applications of Embodiments

One example application of embodiments disclosed herein is as electro-magnetic interference (EMI) shielding. In some of the examples described above, the thickness of the nanofiber sheet (including metallized and/or infiltrated sheet) is at the micro or sub-micron scale (e.g., as thin as 20 nm). Furthermore, some of the examples described above are compressible due to the free volume between nanofibers in the sheet and viscoelastic properties of polymers used to infiltrate the nanofiber sheet. These properties allow some embodiments of the present disclosure to be placed between components, even tightly fitting and/or rigid components, and conform to gaps there between. Because of the compressibility and variety of adhesives that can be infiltrated into the sheet, some of these embodiments can be used as a stress dissipation layer between two materials, thus enabling two materials that expand or contract at different rates to remain physically and/or electrically connected.

Embodiments that are metallized and have two adhesive major surfaces are particularly useful for electromagnetic radiation (and in particular, radio frequency) shielding, thus preventing electromagnetic interference (EMI) from disrupting operation of a device. For example, some embodiments (e.g., single sided adhesive tape or double sided adhesive tape) can be placed between plastic molded elements configured to form an interference fit with one another (such as for structural elements of an outer shell of a mobile computing device). Even for rigid metallic or plastic molded elements, the embodiments described herein can conform to some or all of the contours of the elements, filling the gaps there between and thus preventing electromagnetic radiation from entering the chamber defined by the shell and interfering with the computing elements disposed therein. Furthermore, because embodiments described herein are thin and conformable, they can be used to line an interior of any structure, including as a cover or an intervening element of an interface between elements, thus providing shielding at gaps between elements and for an entire structure fabricated from a material that is transparent to at least some wavelengths of electromagnetic radiation. Also, because some embodiments are flexible, compressible, and otherwise elastically deformable (depending on the polymer used to infiltrate the nanofiber sheet), these embodiments can even be used for flexible electronic devices (whether at a joint or seam or to line an interior chamber) and still maintain sufficient integrity to act as an effective shield against electromagnetic radiation induced interference. Furthermore, double-sided adhesive embodiment can be used to wrap conductive wires, thus providing protection from electromagnetic radiation (e.g., in the case of sensor wires) while also conducting away (e.g., through an attached ground wire) static electricity generated through the triboelectric effect.

In other embodiments, the micron or sub-micron thickness combined with conformability to an underlying surface enables some embodiments to conform to a surface having a fine (e.g., micron-scale or millimeter scale) texture or surface. This can be helpful for filling in gaps between features of the texture or pattern or exhibiting the pattern through the embodiment, while still providing the electrical, mechanical, and optical properties of the embodiment.

Embodiments of the present disclosure may also be used as a thermally conductive material. Using embodiments as a thermal conductor can be beneficial for many of the reasons indicated above, such as the conformability of embodiments to even small surface features, thus eliminating small, insulating pockets that a conventional tape would otherwise not conform too, thus reducing the thermal conductivity of the conventional tape. For example, the ability to stretch various embodiments described above can be used to reduce the size and/or frequency of air bubbles commonly formed between a non-stretchable adhesive tape and an underlying rigid surface. That is, the embodiments described above can be stretched in various directions and to various extents to reduce the presence of air bubbles between the embodiment and the substrate to which the embodiment is attached.

Embodiments may also be used as an adhesive to attach a thermal conductor, such as graphite or a metallic heat sink, to a heat source without acting as a low thermal conductivity barrier between the heat source and the thermal conductor. The thin structure of these materials also contributes to improved thermal conductivity.

Embodiments may also be used as a heater by applying a voltage to an embodiment of the material described herein. For example, because embodiments described herein are compatible with conventional solders, electrical solder contacts can be soldered to nanofiber sheets as described herein, to which an electrical conductor can be connected. The supplied electrical current can then be used to produce Joule heating within a nanofiber sheet. In some examples, the composition and/or thickness of the metal layer is tailored for efficient Joule heating. Furthermore, for embodiments described above in which an infiltrated polymer is an adhesive, the nanofiber tape heater can be conformally adhered to a surface, or between tightly fitting surfaces. In other embodiments, a nanofiber sheet can be configured as an induction heater.

Figure 13:
FIG. 13 is an image of an embodiment of the present disclosure adhered to human skin and in contact with electrodes, in an embodiment.

Embodiments described herein may also be used as, or integrated with, a variety of sensors. For example, because the embodiments described herein are thin, conductive, conformable to an underlying surface, flexible and can be infiltrated with biologically compatible polymers and/or adhesives, embodiments may be integrated with or used as biological sensors. Examples of biological sensors include those used to monitor performance indicators during exercise (e.g., heart rate, calorie consumption rate, respiration rate), and those used to monitor medical data (e.g., monitor heart rate, blood pressure, blood oxygen content, temperature, brain activity), among others. Other examples of sensors to which embodiments can be applied include non-biological sensor used to monitor performance of machines (e.g., for the "internet of things,"), household operations (e.g., room temperatures, appliance functioning, security systems), radio frequency identification (RFID) tags that can be attached to people, animals, or inanimate objects. Embodiments may also be applied to wearable electronics. For example, conductive embodiments may be used as a component of a wearable electronic device (e.g., a flashlight, a sensor) that conform to the position and shape of the user's body. Unlike conventional wearable electronics, embodiments described herein that are applied to wearable electronics need not include an elastic film between the skin of the user and a conductor of the circuit because of the flexibility and conformability of embodiments described herein. In some cases where a sensor is placed directly on the user's body, the circuit can be made to interact passively with an external magnetic field so that an electro-motive force (EMF) is generated and used to monitor movements of the user. An example of direct adhesion to human skin on a flexed portion of a body (useful for a biological sensor application or wearable electronic devices, for example) appears in FIG. 13.

Embodiments of the present disclosure may also be applied to the manufacture or fabrication of electronic device assemblies (e.g., FR4 board level assemblies or semiconductor module level assemblies), whether in the context of industrial fabrication of computing devices or individual, custom fabrication. Whether used as a conductive path, a solderable conductive contact pad or contact, a conductive adhesive for completing copper tape circuits, embodiments described herein have a variety of possible applications to fabrication of computing devices and electrical circuits.

Furthermore, because of the conformability with an underlying surface, compatibility with polymers of any of a variety of types (e.g., adhesives, conductive polymers, aliphatic polymers, aromatic polymers), and elasticity described above, embodiments described herein can be integrated into plastic molding processes (e.g., injection molding, blow molding), and thus conveniently integrated into products produced using these molding processes. Embodiments can also be integrated into other processes used to fabricate ceramic, glass, or polymer structures, thus adding an electrically and thermally conductive element to these conventionally produced products. For example, polymer films can be fabricated with embodiments of the present disclosure to fabricate conductive, stretchable stickers or patches. Embodiments described herein can also be integrated into textile or fabric production to produce a textile or fabric having an integrated electrical path, an integrated sensor, an integrated heating element, that is also stretchable with the garment.

Embodiments described herein may also include nanofiber sheet composites and nanofiber sheet stack composites that, once fabricated, are formed into tubes or elongated shapes having a circular or ellipsoidal cross section. These may be infiltrated with a polymer, as described above, to form an adhesive (and optionally RF radiation blocking) cladding for transmission cables or other electrically conductive members.

Experimental Examples

In one example, a nanofiber forest is prepared using chemical vapor deposition (CVD) in a 45 mm diameter quartz tube using 5 molar percent $C_2H_2$ in Helium (He) at 680° C., at a total flow rate of 580 standard cubic centimeters (sccm) for 10 minutes. The catalyst was a 5 nm thick iron film that was deposited on a Si wafer substrate or glass substrate by electron beam deposition. A nanofiber sheet can then be drawn from the forest using methods described in PCT Publication No. WO 2007/015710, which is incorporated by reference herein in its entirety.

The nanofiber sheet can then be placed on an elastic substrate of silicone rubber. In one example, a silicone rubber sheet was prepared by mixing a same amount of Eco-Flex® 00-20 (available from Smooth-On® of Macungie, Pa.) parts A and B until uniform. The mixture was placed in a vacuum chamber to remove any bubbles. Then, it was poured to a flat surface to make a sheet and cured at room temperature for 2 days. A nanofiber sheet was disposed on release liner of polyolefin film (Funcrare® available from Gunze Plastic Films company of Olathe, Kans.) by drawing the nanofiber sheet directly from CNT forest. Titanium (15 nm) and silver (300 nm) were deposited on the nanofiber sheet using electron beam physical deposition (performed by a CHA Mark 50 available from CHA Industries of Fremont, Calif.). Then, the metalized CNT sheet was laminated on the elastic substrate. Prior to lamination the elastic substrate was stretched to five times the original (i.e., relaxed or contracted) length of the elastic substrate. Because of the tackiness of the material used to fabricate the elastic substrate, the metalized nanofiber sheet adhered to the elastic substrate. A glue solution (P-162N, TOYO INK America, LLC) was applied to the exposed major surface of the nanofiber sheet on the extended, elastic substrate. The glue solution on the nanofiber sheet was dried for 2 min at 100° C. to make a 15 □m thick adhesive layer on the nanofiber sheet. The tension on the elastic substrate was removed. The elastic substrate then relaxed from its extended state to its contracted state. Finally, a release film (SP-PET381130, from LINTEC CORPORATION) was laminated onto the major surface of the nanofiber sheet to which the adhesive layer was applied, thus enabling the composite sheet to be wound without the composite sheet adhering to itself. The release liner was then removed.

The final sheet resistance of the experimental example fabricated according to the above process was 0.5 Ohm/sq.

The final sheet resistance can be tailored by, for example, selecting a thickness of a second conformal metal layer (e.g., Ag). In one example, a second conformal layer of Ag was deposited at a thickness of 150 nm. This produced a final sheet resistance of 1.98 Ohm/sq. In another example, a second conformal layer of Ag was deposited at a thickness of 200 nm. This produced a final sheet resistance of 0.7 Ohm/square. In another example, a second conformal layer of Ag was deposited at a thickness of 300 nm. This produced a final sheet resistance of 0.5 Ohm/square.

Electrical properties are also varied by selecting the metal used for either the first conformal metal layer or the second conformal layer. In some experimental examples, nickel (Ni) was used for the second conformal layer. In one example, a stack of four undensified nanofiber sheets were coated with a first conformal layer of 15 nm thick Ti and then coated with a second conformal layer of Ni that was 200 nm. The metallized nanofibers sheets were then densified using a solvent. The densified, metallized nanofiber sheet in this example had a resistance of 8 Ohms/square.

In another experimental example, an undensified stack of four nanofiber sheets was metallized with a first conformal layer of Ti that was 13 nm thick and then metallized with a second conformal layer of aluminum that was 180 nm thick, This example had a sheet resistance of 5 Ohms/square resistance.

Based on the foregoing examples, it will be appreciated that conductivity of a composite nanofiber sheet can be selected based on the composition of one or more of the conformal metal layers applied and a thickness of one or more of the conformal metal layers. Conductivity, tensile strength, modulus, and other mechanical and physical properties can also be selected based on the nature of the nanofibers used for a sheet (e.g., single wall vs. multiwall nanofibers), the density of nanofibers per unit volume of nanofiber sheet, the dimensions of the nanofiber sheet (in particular thickness), and the properties of the nanofiber forest from which the sheet was draw (e.g., height of the forest (which corresponds to a length of individual nanofibers), a density of the forest)). The properties of the composite nanofiber sheet may also be selected according to the type and quantity of polymer used to infiltrate the nanofiber sheet.

The thickness of the composite nanofiber sheets described above was 25 □m. Much of this thickness is attributable to the adhesive because of the thinness of the nanofiber sheet represents. While the originally applied adhesive layer was measured to be about 15 □m, some of the additional thickness of the composite sheet is likely due to surface variation due to buckling of the contracted composite sheet.

SUMMARY

The foregoing description of the embodiments of the disclosure has been presented for the purpose of illustration;

it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A composite nanofiber sheet comprising:
   a nanofiber sheet having a first major surface and a second major surface opposite the first major surface, the nanofiber sheet comprising a plurality of aligned nanofibers that define a plurality of spaces between the aligned nanofibers of the plurality;
   a first conformal metal layer conformally disposed on outer surfaces of a first portion of the plurality of aligned nanofibers proximate to the first major surface of the nanofiber sheet, the first conformal metal layer comprising a conductive path in the nanofiber sheet; and
   a polymer layer disposed in a plurality of spaces defined by a second portion of the plurality of aligned nanofibers, the polymer layer proximate to the second major surface of the nanofiber sheet,
   wherein at least some polymer of the polymer layer penetrates into the first conformal metal layer,
   wherein the nanofiber sheet is buckled to have a wavy pattern,
   wherein the polymer layer includes a densifying agent that densifies the nanofiber sheet without a separate solvent,
   wherein the polymer layer is an adhesive layer having a wavy structure, and
   wherein the adhesive layer is also disposed proximate to at least a portion of the first major surface of the nanofiber sheet, the composite nanofiber sheet thus forming a conductive double-sided pressure sensitive adhesive nanofiber tape.

2. The composite nanofiber sheet of claim 1, wherein a thickness of the composite nanofiber sheet is less than 30 µm.

3. The composite nanofiber sheet of claim 1, further comprising a solder contact connected to the first major surface via the first conformal metal layer.

4. The composite nanofiber sheet of claim 1, wherein the first conformal metal layer is a carbide-forming metal layer.

5. The composite nanofiber sheet of claim 4, wherein the carbide-forming metal is titanium.

6. The composite nanofiber sheet of claim 1, wherein the first conformal metal layer is from 5 nm to 30 nm thick.

7. The composite nanofiber sheet of claim 1, further comprising a second conformal metal layer deposited on the first conformal metal layer.

8. The composite nanofiber sheet of claim 7, wherein the second conformal metal layer is a silver layer from 10 nm to 500 nm thick.

9. The composite nanofiber sheet of claim 1, further comprising an insulating film disposed on one or both of the first major surface and the second major surface of the nanofiber sheet.

10. The composite nanofiber sheet of claim 1, further comprising at least a second nanofiber sheet stacked with an angular variation in a second direction of nanofiber alignment of at least 1° from a first direction of nanofiber alignment in the nanofiber sheet.

11. A composite nanofiber sheet comprising:
    a nanofiber sheet having a first major surface and a second major surface opposite the first major surface, the nanofiber sheet comprising a plurality of aligned nanofibers that define a plurality of spaces between the aligned nanofibers of the plurality;
    a first conformal metal layer conformally disposed on outer surfaces of a first portion of the plurality of aligned nanofibers proximate to the first major surface of the nanofiber sheet, the first conformal metal layer comprising a conductive path in the nanofiber sheet;
    a polymer layer disposed in a plurality of spaces defined by a second portion of the plurality of aligned nanofibers, the polymer layer proximate to the second major surface of the nanofiber sheet; and
    an elastic substrate on which the nanofiber sheet, the first conformal metal layer, and the polymer layer are disposed,
    wherein the elastic substrate, the nanofiber sheet, the first conformal metal layer, and the polymer layer collectively have a first length in a contracted state and a second length between five to seven times the first length in an extended state.

12. The composite nanofiber sheet of claim 11, wherein a sheet resistance of the composite nanofiber sheet in the contracted state is approximately the same as a sheet resistance in the extended state.

13. The composite nanofiber sheet of claim 11, wherein the nanofiber sheet comprises at least a portion of buckled nanofibers and is configured for repeated elastic extensions between the first length and the second length resulting from unbuckling and re-buckling the portion of nanofibers.

14. A composite nanofiber sheet comprising:
    a nanofiber sheet having a first major surface and a second major surface opposite the first major surface, the nanofiber sheet comprising a plurality of aligned nanofibers that define a plurality of spaces between the aligned nanofibers of the plurality;
    a first conformal metal layer conformally disposed on outer surfaces of a first portion of the plurality of aligned nanofibers proximate to the first major surface of the nanofiber sheet, the first conformal metal layer comprising a conductive path in the nanofiber sheet; and
    a polymer layer disposed in a plurality of spaces defined by a second portion of the plurality of aligned nanofibers, the polymer layer proximate to the second major surface of the nanofiber sheet,
    wherein at least some polymer of the polymer layer penetrates into the first conformal metal layer,
    wherein the nanofiber sheet is buckled to have a wavy pattern,
    wherein the polymer layer includes a densifying agent that densifies the nanofiber sheet without a separate solvent,
    wherein the polymer layer has a wavy structure, and
    wherein the nanofiber sheet comprises at least a portion of buckled nanofibers.

15. The composite nanofiber sheet of claim 14, further comprising a second conformal metal layer conformally disposed over the first conformal metal layer.

16. The composite nanofiber sheet of claim 15, wherein a resistance of the composite nanofiber sheet is less than 10 ohms/square.

* * * * *